(12) United States Patent
Ben-Yaacov et al.

(10) Patent No.: US 8,732,086 B2
(45) Date of Patent: May 20, 2014

(54) METHOD AND SYSTEM FOR MANAGING RIGHTS FOR DIGITAL MUSIC

(75) Inventors: Yaacov Ben-Yaacov, Douglasville, GA (US); Boaz Ben-Yaacov, Douglasville, GA (US)

(73) Assignee: Catch Media, Inc., Douglasville, GA (US)

( * ) Notice: Subject to any disclaimer, the term of this patent is extended or adjusted under 35 U.S.C. 154(b) by 1647 days.

(21) Appl. No.: 10/893,473

(22) Filed: Jul. 16, 2004

(65) Prior Publication Data

US 2005/0065624 A1    Mar. 24, 2005

Related U.S. Application Data

(63) Continuation-in-part of application No. 10/829,581, filed on Apr. 21, 2004, which is a continuation-in-part of application No. 10/336,443, filed on Jan. 2, 2003, now Pat. No. 7,191,193.

(51) Int. Cl.
*G06F 21/10* (2013.01)

(52) U.S. Cl.
USPC ............... 705/51; 705/50; 726/26; 726/27; 726/29; 726/30; 713/189; 713/193

(58) Field of Classification Search
USPC ............ 705/51, 59; 726/26–30; 713/189, 193
See application file for complete search history.

(56) References Cited

U.S. PATENT DOCUMENTS

| | | | |
|---|---|---|---|
| 4,230,990 A | 10/1980 | Lert, Jr. et al. | |
| 4,659,231 A | 4/1987 | Barkouki | |
| 5,016,171 A | 5/1991 | Connolly et al. | |
| 5,129,036 A | 7/1992 | Dean et al. | |
| 5,161,251 A | 11/1992 | Mankovitz | |
| 5,287,408 A | 2/1994 | Samson | |
| 5,303,326 A | 4/1994 | Dean et al. | |

(Continued)

FOREIGN PATENT DOCUMENTS

| | | |
|---|---|---|
| EP | 0 760 505 A2 | 3/1997 |
| EP | 1 016 991 A2 | 7/2000 |

(Continued)

OTHER PUBLICATIONS

M. Nilsson, "ID3 tag version 2.4.0—Native Frames," XP002350036, ID3V2.4.0-frames.txt, v 1.1, retrieved from the internet: http:www/id3.org3v2.4.0-frames.txt (Nov. 1, 2000).

(Continued)

*Primary Examiner* — Mamon Obeid
(74) *Attorney, Agent, or Firm* — Blakely, Sokoloff, Taylor & Zafman LLP

(57) ABSTRACT

A method is described for managing rights for digital music, including registering music players, from among a plurality of music players, with digital archives that store songs, from among a plurality of digital archives, wherein songs can be copied from digital archives to music players, and from music players to digital archives, permitting a music player to copy a song from a digital archive for which it is registered, permitting a digital archive to copy a song from a music player that is registered with the digital archive, restricting a music player from copying a song from a digital archive for which it is not registered, and restricting a digital archive from copying a song from a music player that is not registered with the digital archive. A system and a computer-readable storage medium are also described.

20 Claims, 9 Drawing Sheets

(56) References Cited

U.S. PATENT DOCUMENTS

| | | |
|---|---|---|
| 5,715,403 A | 2/1998 | Stefik |
| 5,892,536 A | 4/1999 | Logan et al. |
| 5,892,900 A | 4/1999 | Ginter et al. |
| 5,918,213 A * | 6/1999 | Bernard et al. ............ 705/26.35 |
| 5,946,664 A | 8/1999 | Ebisawa |
| 5,970,390 A | 10/1999 | Koga et al. |
| 6,088,455 A | 7/2000 | Logan et al. |
| 6,092,080 A | 7/2000 | Gustman |
| 6,142,375 A | 11/2000 | Belka et al. |
| 6,146,276 A | 11/2000 | Okuniewicz |
| 6,163,711 A | 12/2000 | Juntunen et al. |
| 6,202,060 B1 | 3/2001 | Tran |
| 6,266,654 B1 | 7/2001 | Schull |
| 6,336,219 B1 | 1/2002 | Nathan |
| 6,372,974 B1 | 4/2002 | Gross et al. |
| 6,389,162 B2 | 5/2002 | Maeda |
| 6,449,367 B2 | 9/2002 | Van Wie et al. |
| 6,463,444 B1 | 10/2002 | Jain et al. |
| 6,567,984 B1 | 5/2003 | Allport |
| 6,608,930 B1 | 8/2003 | Agnihotri et al. |
| 6,615,192 B1 | 9/2003 | Tagawa et al. |
| 6,636,588 B2 | 10/2003 | Kimura et al. |
| 6,662,231 B1 | 12/2003 | Drosset et al. |
| 6,671,494 B1 | 12/2003 | James |
| 6,697,944 B1 | 2/2004 | Jones et al. |
| 6,748,537 B2 | 6/2004 | Hughes |
| 6,771,748 B2 | 8/2004 | Parker et al. |
| 6,774,604 B2 | 8/2004 | Matsuda et al. |
| 6,774,796 B2 | 8/2004 | Smith |
| 6,834,308 B1 | 12/2004 | Ikezoye et al. |
| 6,847,950 B1 | 1/2005 | Kamibayashi et al. |
| 6,876,974 B1 | 4/2005 | Marsh et al. |
| 6,880,081 B1 | 4/2005 | Itkis |
| 6,888,950 B2 | 5/2005 | Siskin et al. |
| 6,934,837 B1 | 8/2005 | Jaisimha et al. |
| 6,947,598 B2 | 9/2005 | Yogeshwar et al. |
| 6,983,371 B1 * | 1/2006 | Hurtado et al. ............... 713/189 |
| 7,006,424 B2 | 2/2006 | Nonaka et al. |
| 7,020,888 B2 | 3/2006 | Reynolds et al. |
| 7,046,239 B2 | 5/2006 | Asai et al. |
| 7,046,956 B1 | 5/2006 | Cohen |
| 7,073,063 B2 * | 7/2006 | Peinado ........................ 713/171 |
| 7,119,267 B2 | 10/2006 | Hirade et al. |
| 7,134,145 B1 | 11/2006 | Epstein |
| 7,158,842 B2 | 1/2007 | Ohmura et al. |
| 7,170,999 B1 | 1/2007 | Kessler et al. |
| 7,188,186 B1 | 3/2007 | Meyer et al. |
| 7,191,193 B2 | 3/2007 | Ben-Yaacov et al. |
| 7,203,966 B2 | 4/2007 | Abburi et al. |
| 7,231,656 B2 | 6/2007 | Nathan |
| 7,281,034 B1 | 10/2007 | Eyal |
| 7,343,347 B2 | 3/2008 | Ostrover et al. |
| 7,363,372 B2 | 4/2008 | Potenzone et al. |
| 7,370,017 B1 | 5/2008 | Lindeman et al. |
| 7,389,273 B2 * | 6/2008 | Irwin et al. ........................ 705/59 |
| 7,415,439 B2 * | 8/2008 | Kontio et al. ................... 705/53 |
| 7,421,411 B2 * | 9/2008 | Kontio et al. ................... 705/52 |
| 7,440,365 B2 | 10/2008 | Hattori et al. |
| 7,512,549 B1 | 3/2009 | Morita et al. |
| 7,516,213 B2 | 4/2009 | Cunningham et al. |
| 7,523,312 B2 | 4/2009 | Kalker et al. |
| 7,600,266 B2 | 10/2009 | Thomas |
| 7,707,221 B1 | 4/2010 | Dunning et al. |
| 7,730,300 B2 | 6/2010 | Candelore |
| 7,756,792 B2 | 7/2010 | Hughes |
| 7,756,915 B2 | 7/2010 | Ben-Yaacov et al. |
| 7,761,176 B2 | 7/2010 | Ben-Yaacov et al. |
| 7,925,591 B2 | 4/2011 | Gajjala et al. |
| 7,930,758 B2 * | 4/2011 | Cho et al. ........................ 726/27 |
| 8,201,262 B2 * | 6/2012 | Matsuo et al. .................. 726/27 |
| 8,327,454 B2 * | 12/2012 | Jogand-Coulomb et al. ... 726/27 |
| 8,413,255 B2 * | 4/2013 | Cho et al. ........................ 726/26 |
| 2001/0018693 A1 | 8/2001 | Jain et al. |
| 2001/0051996 A1 | 12/2001 | Cooper |
| 2002/0007350 A1 | 1/2002 | Yen |
| 2002/0007351 A1 | 1/2002 | Hillegass et al. |
| 2002/0010759 A1 * | 1/2002 | Hitson et al. ................... 709/219 |
| 2002/0015362 A1 | 2/2002 | Cowgill et al. |
| 2002/0032747 A1 * | 3/2002 | Toki ............................... 709/217 |
| 2002/0045960 A1 | 4/2002 | Phillips et al. |
| 2002/0066115 A1 | 5/2002 | Wendelrup |
| 2002/0068558 A1 | 6/2002 | Janik |
| 2002/0076051 A1 | 6/2002 | Nii |
| 2002/0077984 A1 | 6/2002 | Ireton |
| 2002/0077986 A1 | 6/2002 | Kobata et al. |
| 2002/0100062 A1 | 7/2002 | Lowthert et al. |
| 2002/0114466 A1 | 8/2002 | Tanaka et al. |
| 2002/0116277 A1 | 8/2002 | Kraft |
| 2002/0120456 A1 | 8/2002 | Berg et al. |
| 2002/0126762 A1 | 9/2002 | Tanaka |
| 2002/0138852 A1 | 9/2002 | Reynolds et al. |
| 2002/0157002 A1 * | 10/2002 | Messerges et al. ............ 713/155 |
| 2002/0177914 A1 | 11/2002 | Chase |
| 2002/0184537 A1 | 12/2002 | Inokuchi et al. |
| 2002/0186844 A1 | 12/2002 | Levy et al. |
| 2002/0189427 A1 | 12/2002 | Pachet |
| 2003/0009423 A1 | 1/2003 | Wang et al. |
| 2003/0009681 A1 * | 1/2003 | Harada et al. ................. 713/193 |
| 2003/0018491 A1 * | 1/2003 | Nakahara et al. ................. 705/1 |
| 2003/0018582 A1 | 1/2003 | Yaacovi |
| 2003/0021441 A1 | 1/2003 | Levy et al. |
| 2003/0028622 A1 | 2/2003 | Inoue et al. |
| 2003/0040206 A1 | 2/2003 | Wang et al. |
| 2003/0050894 A1 | 3/2003 | Kambayashi et al. |
| 2003/0065642 A1 | 4/2003 | Zee |
| 2003/0076955 A1 * | 4/2003 | Alve et al. ...................... 380/201 |
| 2003/0078891 A1 | 4/2003 | Capitant |
| 2003/0079030 A1 * | 4/2003 | Cocotis et al. ................. 709/229 |
| 2003/0079038 A1 | 4/2003 | Robbin et al. |
| 2003/0084126 A1 | 5/2003 | Kumar et al. |
| 2003/0084306 A1 | 5/2003 | Abburi et al. |
| 2003/0098817 A1 | 5/2003 | Choi |
| 2003/0110502 A1 | 6/2003 | Creed et al. |
| 2003/0120541 A1 | 6/2003 | Siann et al. |
| 2003/0131252 A1 * | 7/2003 | Barton ........................... 713/193 |
| 2003/0135513 A1 | 7/2003 | Quinn et al. |
| 2003/0154378 A1 | 8/2003 | Hirano |
| 2003/0158737 A1 | 8/2003 | Csicsatka |
| 2003/0163823 A1 | 8/2003 | Logan et al. |
| 2003/0172113 A1 | 9/2003 | Cameron et al. |
| 2003/0177073 A1 | 9/2003 | Ogai |
| 2003/0182184 A1 | 9/2003 | Strasnick et al. |
| 2003/0188150 A1 * | 10/2003 | Ohkado et al. ................. 713/150 |
| 2003/0217057 A1 | 11/2003 | Kuroiwa et al. |
| 2003/0226012 A1 * | 12/2003 | Asokan et al. ................. 713/156 |
| 2003/0229654 A1 * | 12/2003 | Bibas et al. .................... 707/203 |
| 2003/0232593 A1 | 12/2003 | Wahlroos et al. |
| 2003/0233929 A1 | 12/2003 | Agnihotri et al. |
| 2004/0003281 A1 | 1/2004 | Sonoda et al. |
| 2004/0003398 A1 | 1/2004 | Donian et al. |
| 2004/0013125 A1 | 1/2004 | Betker et al. |
| 2004/0021704 A1 | 2/2004 | Mitsutake |
| 2004/0049559 A1 | 3/2004 | Saubade |
| 2004/0058649 A1 | 3/2004 | Grady |
| 2004/0078338 A1 | 4/2004 | Ohta et al. |
| 2004/0089141 A1 | 5/2004 | Georges et al. |
| 2004/0089142 A1 | 5/2004 | Georges et al. |
| 2004/0117442 A1 | 6/2004 | Thielen |
| 2004/0128324 A1 * | 7/2004 | Sheynman et al. ............ 707/200 |
| 2004/0131255 A1 | 7/2004 | Ben-Yaacov et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0148191 A1 | 7/2004 | Hoke, Jr. |
| 2004/0158741 A1 * | 8/2004 | Schneider ...................... 713/201 |
| 2004/0187014 A1 | 9/2004 | Molaro |
| 2004/0199771 A1 | 10/2004 | Morten et al. |
| 2004/0224638 A1 | 11/2004 | Fadell et al. |
| 2004/0225612 A1 | 11/2004 | Shimojima et al. |
| 2004/0252966 A1 | 12/2004 | Holloway et al. |
| 2004/0253945 A1 | 12/2004 | Janik |
| 2004/0255135 A1 * | 12/2004 | Kitaya et al. .................. 713/193 |
| 2004/0267390 A1 | 12/2004 | Ben-Yaacov et al. |
| 2005/0004873 A1 | 1/2005 | Pou et al. |

(56) References Cited

U.S. PATENT DOCUMENTS

| | | |
|---|---|---|
| 2005/0014536 A1 | 1/2005 | Grady |
| 2005/0015464 A1 | 1/2005 | Young |
| 2005/0055352 A1 | 3/2005 | White et al. |
| 2005/0065624 A1 | 3/2005 | Ben-Yaacov et al. |
| 2005/0071280 A1* | 3/2005 | Irwin et al. ............ 705/59 |
| 2005/0071663 A1 | 3/2005 | Medvinsky et al. |
| 2005/0120380 A1 | 6/2005 | Wolfe |
| 2005/0125087 A1 | 6/2005 | Ben-Yaacov et al. |
| 2005/0171938 A1 | 8/2005 | Fisher et al. |
| 2005/0210261 A1 | 9/2005 | Kamperman et al. |
| 2005/0210395 A1 | 9/2005 | Wakita et al. |
| 2005/0227679 A1 | 10/2005 | Papulov |
| 2006/0010075 A1 | 1/2006 | Wolf |
| 2006/0030961 A1 | 2/2006 | Lin |
| 2006/0031257 A1 | 2/2006 | Lipscomb et al. |
| 2006/0031558 A1 | 2/2006 | Ortega et al. |
| 2006/0107330 A1 | 5/2006 | Ben-Yaacov et al. |
| 2006/0122881 A1 | 6/2006 | Walker et al. |
| 2006/0242083 A1 | 10/2006 | Chavez |
| 2007/0030972 A1 | 2/2007 | Glick et al. |
| 2007/0038999 A1 | 2/2007 | Millington |
| 2007/0094276 A1 | 4/2007 | Isaac |
| 2007/0112678 A1 | 5/2007 | Himelfarb |
| 2007/0156762 A1 | 7/2007 | Ben-Yaacov et al. |
| 2007/0162395 A1 | 7/2007 | Ben-Yaacov et al. |
| 2007/0198426 A1 | 8/2007 | Yates et al. |
| 2007/0198859 A1* | 8/2007 | Harada et al. ............ 713/193 |
| 2007/0244794 A1 | 10/2007 | Fenley |
| 2007/0250403 A1 | 10/2007 | Altschuler |
| 2007/0271184 A1 | 11/2007 | Niebert et al. |
| 2008/0183595 A1 | 7/2008 | Sakamoto |
| 2008/0320598 A1 | 12/2008 | Ben-Yaacov et al. |
| 2008/0320605 A1 | 12/2008 | Ben-Yaacov et al. |
| 2009/0043412 A1 | 2/2009 | Ben-Yaacov et al. |
| 2009/0044285 A1 | 2/2009 | Ben-Yaacov et al. |
| 2009/0077190 A1 | 3/2009 | Gupta |
| 2009/0093899 A1 | 4/2009 | Ben-Yaacov et al. |
| 2009/0094663 A1 | 4/2009 | Ben-Yaacov et al. |
| 2009/0248535 A1 | 10/2009 | Fisher et al. |
| 2010/0036759 A1 | 2/2010 | Ben-Yaacov et al. |
| 2010/0333211 A1 | 12/2010 | Schonfeld et al. |

FOREIGN PATENT DOCUMENTS

| | | |
|---|---|---|
| EP | 1 074 926 A2 | 2/2001 |
| EP | 1 251 440 A2 | 10/2002 |
| EP | 1 304 874 A2 | 4/2003 |
| EP | 1 307 062 A1 | 5/2003 |
| EP | 1 898 323 A1 | 3/2008 |
| EP | 2 096 599 A1 | 9/2009 |
| EP | 2 098 973 A1 | 9/2009 |
| GB | 2 364 215 A | 1/2002 |
| GB | 2 380 364 A | 4/2003 |
| JP | 08-046538 | 2/1996 |
| JP | 08-152881 | 6/1996 |
| JP | 08-263440 | 10/1996 |
| JP | 10-308056 | 11/1998 |
| JP | 11-073730 | 3/1999 |
| JP | 11-122129 | 4/1999 |
| JP | 11-259964 | 9/1999 |
| JP | 2000-269904 | 9/2000 |
| JP | 2000-307527 | 11/2000 |
| JP | 2000-315177 | 11/2000 |
| JP | 2001-022843 | 1/2001 |
| JP | 2001-075871 | 3/2001 |
| JP | 2001-236081 | 8/2001 |
| JP | 2001-320373 | 11/2001 |
| JP | 2002-015147 | 1/2002 |
| JP | 2002-162973 | 6/2002 |
| JP | 2002-230895 | 8/2002 |
| JP | 2002-245066 | 8/2002 |
| JP | 2002-262254 | 9/2002 |
| JP | 2002-351744 | 12/2002 |
| JP | 2002-359803 | 12/2002 |
| JP | 2003-114949 | 4/2003 |
| JP | 2003-124921 | 4/2003 |
| JP | 2003-338976 | 11/2003 |
| JP | 2003-339000 | 11/2003 |
| JP | 2003-536144 | 12/2003 |
| JP | 2004-517377 | 6/2004 |
| JP | 2004-185172 | 7/2004 |
| JP | 2005-071522 | 3/2005 |
| JP | 2005-517238 | 6/2005 |
| JP | 2005-539469 | 12/2005 |
| JP | 2006-515009 | 5/2006 |
| WO | WO 00/07310 A1 | 2/2000 |
| WO | WO 00/45291 A1 | 8/2000 |
| WO | WO 00/58963 A2 | 10/2000 |
| WO | WO 01/13311 A2 | 2/2001 |
| WO | WO 01/25948 A1 | 4/2001 |
| WO | WO 01 46783 A2 | 6/2001 |
| WO | WO 01/53963 A1 | 7/2001 |
| WO | WO 01/62004 A2 | 8/2001 |
| WO | WO 01/63822 A2 | 8/2001 |
| WO | WO 01/95206 A1 | 12/2001 |
| WO | WO 02/31618 A2 | 4/2002 |
| WO | WO 03/005145 A2 | 1/2003 |
| WO | WO 03/034408 A2 | 4/2003 |
| WO | WO 03/058410 A | 7/2003 |
| WO | WO 2004/027588 A2 | 4/2004 |
| WO | WO 2004/061547 A2 | 7/2004 |
| WO | WO 2004/070538 A2 | 8/2004 |
| WO | WO 2005/106876 A2 | 11/2005 |
| WO | WO 2006/019608 A1 | 2/2006 |
| WO | WO 2006/058149 A2 | 6/2006 |
| WO | WO 2008/070062 A2 | 6/2008 |
| WO | WO 2007/055845 A2 | 7/2008 |

OTHER PUBLICATIONS

R. Mori, et al., "Superdistribution: An Electronic Infrastructure for the Economy of the Future," XP002072402, Transactions of Information Processing Society of Japan, vol. 38, No. 7, pp. 1465-1472 (Jul. 1997).

"Wikipedia: FairPlay", Wikipedia, The Free Encyclopedia (Online) XP002414372, 4 pages (Oct. 11, 2005).

PCT Notification Concerning Transmittal of International Preliminary Report on Patentability (Chapter 1 of the Patent Cooperation Treaty for PCT Counterpart Application No. PCT/US2006/039107 Containing International Search Report, (Jul. 10, 2008).

PCT Invitation to Pay Additional Fees for PCT Counterpart Application No. PCT/US2006/039107, Containing Communication Relating to the Results of the Partial International Search Report (Feb. 15, 2007).

PCT Notification of Transmittal of the International Search Report and the Written Opinion of the International Searching Authority or The Declaration for PCT Counterpart Application No. PCT/US05/024212 Containing the International Search Report (Nov. 8, 2005).

PCT Notification of Transmittal of the International Search Report and the Written Opinion of the International Searching Authority or The Declaration for PCT Counterpart Application No. PCT/US2006/039107 Containing the International Search Report (Nov. 20, 2007).

Office Action for U.S. Appl. No. 12/337,598, mailed Feb. 18, 2011, 10 pgs.

Office Action for U.S. Appl. No. 12/337,598, mailed Sep. 6, 2011, 13 pgs.

Office Action for U.S. Appl. No. 12/337,600, mailed Jul. 8, 2011, 15 pgs.

Office Action for U.S. Appl. No. 12/252,926, mailed May 24, 2011, 15 pgs.

Office Action for U.S. Appl. No. 12/252,926, mailed Oct. 7, 2011, 16 pgs.

Office Action for U.S. Appl. No. 12/252,941, mailed May 10, 2011, 12 pgs.

Office Action for U.S. Appl. No. 12/252,941, mailed Jul. 25, 2011, 3 pgs.

Office Action for U.S. Appl. No. 12/200,586, mailed Oct. 3, 2011, 20 pgs.

(56) References Cited

OTHER PUBLICATIONS

Office Action for U.S. Appl. No. 12/200,606, mailed Jun. 20, 2011, 15 pgs.
Office Action for U.S. Appl. No. 12/200,606, mailed Jan. 26, 2012, 19 pgs.
Office Action for U.S. Appl. No. 11/607,163, mailed Aug. 18, 2011, 17 pgs.
Office Action for Israel Application No. 180559, mailed Jul. 20, 2011, 5 pgs. (including English Language Summary of the Office Action).
Office Action for Australian Application No. 2010257287, mailed Jun. 27, 2011, 2 pgs.
Tony Bove, "The iPod Companion", Muska & Lipman, 27 pgs. (including Table of Contents, ix, 1-21, 3, and 80), (2003).
Antonin Billet, "PDA: le Sypod veut séduire par le multimédia", retrieved from the Internet: http://www.01net.com/editorial/175530/pda-le-sypod-veut-seduire-par-le-multimedia/, 3 pgs. (including Google translation), (Feb. 2, 2004).
"Songs-DB 1.3", Soft32, retrieved from the Internet http://songs-db.soft32.com/, 5 pgs., (Jun. 14, 2003).
Internetnews.com Staff, "Songcatcher Snatches Tunes From Live Radio", retrieved from the Internet http://www.internetnews.com/ec-news/print.php/532651, 1 pg., (Dec. 12, 2000).
PCT Notification of Transmittal of the International Search Report and the Written Opinion of the International Searching Authority, or the Declaration for PCT Application No. PCT/US12/26408, 13 pgs., (Aug. 10, 2012).
Office Action for U.S. Appl. No. 12/337,598, mailed Oct. 1, 2012, 13 pgs.
Office Action for U.S. Appl. No. 12/252,926, mailed Apr. 4, 2012, 15 pgs.
Office Action for U.S. Appl. No. 12/200,586, mailed Jun. 14, 2012, 14 pgs.
Office Action for U.S. Appl. No. 11/607,163 mailed May 22, 2012, 16 pgs.
Office Action for Japanese Application No. 2010-199652, mailed Apr. 5, 2012, 6 pgs. (including English Translation of the Office Action).
Office Action for Canadian Application No. 2,626,314, mailed May 16, 2012, 3 pgs.
Office Action for Australian Application No. 2010257287, mailed Apr. 2, 2012, 2 pgs.
Office Action for Japanese Application No. 2011-016355, mailed Aug. 16, 2012, 10 pgs. (including English translation of the Office Action).
Office Action for Canadian Application No. 2,784,879, mailed Dec. 6, 2012, 4 pgs.
Office Action for European Application No. 06825548.8, mailed Jul. 31, 2012, 4 pgs.
Office Action for U.S. Appl. No. 10/336,443, mailed Oct. 4, 2004.
Office Action for U.S. Appl. No. 10/336,443, mailed May 17, 2005.
Office Action for U.S. Appl. No. 10/336,443, mailed Oct. 21, 2005.
Office Action for U.S. Appl. No. 10/336,443, mailed May 31, 2006.
Office Action for U.S. Appl. No. 11/708,997, mailed Feb. 9, 2009.
Office Action for U.S. Appl. No. 11/708,997, mailed Sep. 28, 2009.
Office Action for U.S. Appl. No. 10/829,581, mailed Jun. 27, 2008.
Office Action for U.S. Appl. No. 10/829,581, mailed Feb. 18, 2009.
Office Action for U.S. Appl. No. 10/829,581, mailed Aug. 14, 2009.
Office Action for U.S. Appl. No. 10/829,581, mailed Feb. 4, 2010.
Office Action for U.S. Appl. No. 10/829,581, mailed Jul. 20, 2010.
Office Action for U.S. Appl. No. 12/252,926, mailed Oct. 6, 2010.
Office Action for U.S. Appl. No. 11/261,687, mailed Oct. 20, 2008.
Office Action for U.S. Appl. No. 11/261,687, mailed Jul. 9, 2009.
Office Action for U.S. Appl. No. 11/261,687, mailed Oct. 27, 2009.
Office Action for U.S. Appl. No. 10/997,606, mailed Apr. 14, 2008.
Office Action for U.S. Appl. No. 10/997,606, mailed Oct. 27, 2008.
Office Action for U.S. Appl. No. 10/997,606, mailed Jun. 26, 2009.
Office Action for Australian Application No. 2005275431, mailed Feb. 11, 2010.
Office Action for European Application No. 05769589.2, mailed Jul. 29, 2010.
Office Action for Israel Application No. 180559, mailed May 11, 2010.
Office Action for Israel Application No. 200109, mailed May 3, 2010.
Office Action for Israel Application No. 200110, mailed May 6, 2010.
PCS Electronics, "RDS Max 2.0", XP002336990, retrieved from the Internet: http://web.archive.org/web/20040413050058/www.ppcs-electronics.com/en/products.php?EDS_encod>, 3 pgs., (Mar. 22, 2004).
Amazon.com Description, "HP Jordana 545 Pocket PC", XP002336991, retrieved from the Internet: http:www.pdasupport.com/Jordana545.htm>, 3 pgs., (Apr. 2000).
Richard Menta, et al., "Review: Neuros MP3 Digital Audio Computer", MP3newswire.net, XP002336992, retrieved from the Internet: http://www.mp3newswire.net/stories/2003/neuros.html>, 6 pgs., (May 29, 2003).
Philips Research, "Audio Fingerprinting for Automatic Music Recognition", XP002347089, retrieved from the Internet: http://www.research.philips.com/initiatives/contentid/downloads/audio_finger-printing_leaflet.pdf>, 2 pgs., (Mar. 2004).
Jaap Haitsma, et al., "A Highly Robust Audio Fingerprinting System", XP002347090, IRCAM, retrieved from the Internet: http://ismir2002.ismir.net/proceedings/02-FP04-2.pdf, 9 pgs., (2002).
Internet Article, "IPOD Track Display", XP00236993, retrieved from the Internet: http://halfbakery.com/idea/IPOD_20track_20display>, 2 pgs., (Sep. 18, 2003).
Internet Article, "MINI2 Forums—RDS—Radio Text", XP002336994, retrieved from the Internet: http://www.mini2.com/forum/archive/index.php/t-24296>, 3 pgs., (Feb. 7, 2003).
Internet Article, "Digiana AudiaX FM Linker", XP002337103, retrieved from the Internet: http://www.i4u.com/article396.html>, 1 pg., (May 30, 2003).
"Gotuit Media Secures $2.1 Million in First-Round Angel Funding Led by Topol Group", PR Newswire, pNA, The Gale Group, 2 pgs., (Aug. 15, 2000).
Julie Strietelmeier, "Gadgeteer Hands on Review: Apple iPod (3rd Generation 30GB Model)", The Gadgeteer, retrieved from the Internet on Jun. 21, 2008: http://web.archive.org/web/20030622180433/www.the-gadgeteer.com/apple-ipod-30gb-review.html, 10 pgs., (Jun. 6, 2003).
Staff, "Griffin Technology Ships New iTrip for 3rd Generation iPods", The Mac Observer, retrieved from the Internet on Jun. 21, 2008: http://web.archive.org/web/20040109234748/http://www.macobserver.com/article/2003/10/08.5shtml, 2 pgs., (Oct. 8, 2003).
David Carey, "Apple's iPod Packs a Pricey Punch", TechOnline, retrieved from the Internet on Feb. 13, 2009: http://www.techonlinen.com/article/printArticle.jhtml?articleID=193100821, 3 pgs., (Mar. 26, 2002).
Office Action for U.S. Appl. No. 12/252,941, mailed Nov. 12, 2010, 12 pgs.
Action for Japanese Application No. 521512/2007, mailed May 18, 2010, 8 pgs. (including English Language Summary of the Office Action).
Office Action for Japanese Application No. 521512/2007, mailed Nov. 16, 2010, 5 pgs. (including English Language Summary of the Office Action).
Office Action for Japanese Application No. 537730/2008, mailed Oct. 5, 2010, 8 pgs. (including English Language Summary of the Office Action).
Office Action for U.S. Appl. No. 10/829,581, mailed Feb. 2, 2011, 13 pgs.
Office Action for U.S. Appl. No. 12/337,600, mailed Jan. 24, 2011, 15 pgs.
Office Action for Israel Application No. 180559, mailed May 11, 2010, 4 pgs. (including English Language Summary of the Office Action).

* cited by examiner

METHOD AND SYSTEM FOR MANAGING RIGHTS FOR DIGITAL MUSIC

CROSS REFERENCE TO RELATED APPLICATIONS

This application is a continuation-in-part of pending U.S. patent application Ser. No. 10/829,581, filed on Apr. 21, 2004, entitled Portable Music Player and Transmitter, which is a continuation-in-part of U.S. application Ser. No. 10/336,443, now U.S. Pat. No. 7,191,193, filed on Jan. 2, 2003, entitled Automatic Digital Music Library Builder. The present patent application claims priority from both application Ser. No. 10/829,581 and application Ser. No. 10/336,443.

FIELD

Embodiments of the present invention relate to rights management for digital musical recordings.

BACKGROUND

Copyright law regarding devices that make copies of digital recordings is set forth in 17 U.S.C, Chapter 10, referred to as the "Digital Home Audio Recording Act of 1992." Specifically, this Act requires payment of specific royalties to the Register of Copyrights. Royalty payments for digital audio recording devices are 2% of their transfer price, and royalty payments for digital audio recording media are 3% of their transfer price.

Copyright law regarding Internet service providers is set forth in the Digital Millennium Copyright Act of 1998.

Consumers are generally aware to some extent of copyright laws concerning digital recordings, but there are no automatic features in place to assist consumers in abiding with them. For example, a consumer who purchases a song on a CD, or through a subscription with an Internet music sharing service such as Napster, generally does not know if he is permitted to make personal copies of the song for himself, on one or more of his computers, or on one or more CDs, or on one or more MP3 players.

It would be beneficial if a system was in place to advise consumers whether or not a song may be copied for specific uses, and, if so, how many copies are permitted, and, if not, how to obtain the necessary copyright permission.

SUMMARY OF THE DESCRIPTION

The present invention concerns a configurable method and system for managing copyright privileges when a digital song is copied from one digital audio device to another.

In a general setting, digital songs are (i) acquired from external sources, including, inter alia, Internet music services such as iTunes® and Napster®, CDs and other recording media, music kiosks and broadcast music stations such as cable and satellite stations; and thereafter (ii) copied between digital audio recorders and digital audio players. Transfer of songs may be likened in some respects to a virtual water distribution system with nodes and conduits, wherein the nodes store water and the conduits transmit water from one node to another. External nodes represent music sources such as record stores, kiosks and Internet music services; and internal nodes represent audio recorders and players.

Within this paradigm of water distribution, digital rights management concerns controlling valves that restrict the flow of water within the pipes.

For an embodiment of the present invention, digital audio devices are registered with one another; and songs stored within recorders and players are labeled as being Purchased, Recorded or Try & Buy.

Preferably, digital audio players are registered with either zero or one digital audio recorder. In other words, a digital player cannot be registered with more than one recorder, but one digital recorder can have multiple digital players registered therewith.

Preferably, the label of a song is used to identify copyrights associated therewith. The Try & Buy label is used for promotional or trial versions of songs, and generally include an expiration event, upon occurrence of which the song "evaporates;" i.e., can no longer be played in its entirety.

For an embodiment of the present invention, copyright management is achieved by (i) restricting a song from being copied from a source device to a target device; and (ii) specifying the way a song is labeled within a target device when the song is copied from a source device to the target device— based on the source device, the target device, the label of the song in the source device, and based on whether or not the source and target device are commonly registered.

Further, for an alternate embodiment of the present invention, copyright management may restrict the number of copies permitted to be made for a song resident on a source device. For example, when a recorder is used to copy songs to a plurality of players, up to three copies of a song may be permitted.

Thus, embodiments of the present invention enable audio device manufacturers to configure a flexible logic for digital rights management in accordance with legal requirements in their respective locales. Various such configurations are described in the detailed description hereinbelow.

In distinction from embodiments of the present invention, prior art digital rights managers do not include the fundamental feature of adapting labels from source label to target label when a song is copied from a source device to a target device. One such prior art digital rights manager is Microsoft Corporation's Windows Media Rights Manager, which implements digital rights by encrypting audio files using keys, and packaging the files with key IDs. In order to play the audio files, a user obtains a license, which contains a key to decrypt the file.

Another such prior art digital rights manager is Apple Corporation's iTunes rights manager, which registers iPod music players with computers, so that an iPod cannot download a digital song from a computer that it is not registered with.

There is thus provided in accordance with an embodiment of the present invention a method for managing rights for digital music, including registering music players, from among a plurality of music players, with digital archives that store songs, from among a plurality of digital archives, wherein songs can be copied from digital archives to music players, and from music players to digital archives, permitting a music player to copy a song from a digital archive for which it is registered, permitting a digital archive to copy a song from a music player that is registered with the digital archive, restricting a music player from copying a song from a digital archive for which it is not registered, and restricting a digital archive from copying a song from a music player that is not registered with the digital archive.

There is additionally provided in accordance with an embodiment of the present invention a method for managing rights for digital music, including maintaining, by a digital archive of songs, for a song stored in the digital archive, a maximum number of permitted copies of the song, tracking, within the digital archive, for the song, a count of music players that copied the song from the digital archive, permitting a music player to copy the song from the digital archive if the count for the song has not reached the maximum number of permitted copies for the song, and restricting a music player from copying the song from the digital archive if the count for the song has reached the maximum number of permitted copies for the song.

There is moreover provided in accordance with an embodiment of the present invention a method for managing rights for digital music, including registering groups of digital audio devices from among a plurality of digital audio devices with one another, the digital audio devices being able to store digital songs and to copy digital songs from one to another, labeling digital songs stored within digital audio devices according to copyright privileges, determining whether or not a song may be copied from a source digital audio device to a target digital audio device, and prescribing the label of a song within the target digital audio device when the song is copied from the source digital audio device to the target digital audio device, wherein the determining and the prescribing are based on the source digital audio device, the target digital audio device and the label of the song within the source digital audio device, and also based on whether or not the source and target digital audio devices are registered with one another.

There is further provided in accordance with an embodiment of the present invention a computer-readable storage medium storing program code for causing a device to perform the steps of registering music players, from among a plurality of music players, with digital archives that store songs, from among a plurality of digital archives, wherein songs can be copied from digital archives to music players, and from music players to digital archives, permitting a music player to copy a song from a digital archive for which it is registered, permitting a digital archive to copy a song from a music player that is registered with the digital archive, restricting a music player from copying a song from a digital archive for which it is not registered, and restricting a digital archive from copying a song from a music player that is not registered with the digital archive.

There is yet further provided in accordance with an embodiment of the present invention a computer-readable storage medium storing program code for causing a device to perform the steps of maintaining, by a digital archive of songs, for a song stored in the digital archive, a maximum number of permitted copies of the song, tracking, within the digital archive, for the song, a count of music players that copied the song from the digital archive, permitting a music player to copy the song from the digital archive if the count for the song has not reached the maximum number of permitted copies for the song, and restricting a music player from copying the song from the digital archive if the count for the song has reached the maximum number of permitted copies for the song.

There is additionally provided in accordance with an embodiment of the present invention a computer-readable storage medium storing program code for causing a device to perform the steps of registering groups of digital audio devices from among a plurality of digital audio devices with one another, the digital audio devices being able to store digital songs and to copy digital songs from one to another, labeling digital songs stored within digital audio devices according to copyright privileges, determining whether or not a song may be copied from a source digital audio device to a target digital audio device, and prescribing the label of a song within the target digital audio device when the song is copied from the source digital audio device to the target digital audio device, wherein the determining and the prescribing are based on the source digital audio device, the target digital audio device and the label of the song within the source digital audio device, and also based on whether or not the source and target digital audio devices are registered with one another.

There is moreover provided in accordance with an embodiment of the present invention a system for managing rights for digital music, comprising a plurality of digital archives that store songs, a plurality of music players at least some of which are registered with digital archives, wherein songs can be copied from digital archives to music players, and from music players to digital archives, and a rights manager housed within a digital archive permitting a music player to copy a song from the digital archive if the music player is registered with the digital archive, permitting the digital archive to copy a song from a music player if the music player is registered with the digital archive, restricting a music player from copying a song from the digital archive if the music player is not registered with the digital archive, and restricting the digital archive from copying a song from a music player if the music player is not registered with the digital archive.

There is further provided in accordance with an embodiment of the present invention a system for managing rights for digital music, including a digital archive of songs including a database manager for maintaining a maximum number of permitted copies of a song, for a song stored within the digital archive, and for tracking a count of music players that copied the song from the digital archive, and a rights manager for permitting a music player to copy the song from the digital archive if the count for the song has not reached the maximum number of permitted copies for the song, and for restricting a music player from copying the song from the digital archive if the count for the song has reached the maximum number of permitted copies for the song.

A system is described for managing rights for digital music, including a plurality of audio devices, each being able to store digital songs and to copy digital songs from one to another, wherein groups of the digital audio devices are registered with one another. A database manager is provided for labeling digital songs stored within digital audio devices according to copyright privileges, for determining whether or not a song may be copied from a source digital audio device to a target digital audio device, and for prescribing the label of a song within the target digital audio device when the song is copied from the source digital audio device to the target digital audio device. Said determining and said prescribing are based on the source digital audio device, the target digital audio device and the label of the song within the source digital audio device, and also based on whether or not the source and target digital audio devices are registered with one another.

BRIEF DESCRIPTION OF THE DRAWINGS

The present invention will be more fully understood and appreciated from the following detailed description, taken in conjunction with the drawings in which.

DETAILED DESCRIPTION

Figure 1:
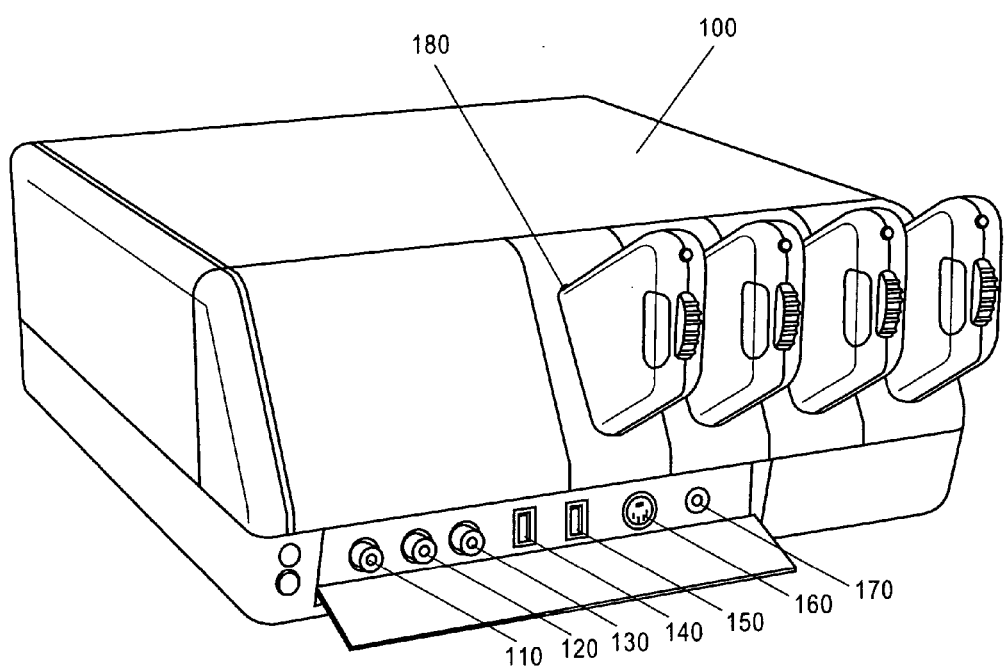
FIG. 1 is a front view of a digital archive, referred to as a "Nest," in accordance with an embodiment of the present invention.

Digital music players are proliferating as standalone consumer electronic devices, such as MP3 players, as bundled components within portable devices such as personal data assistants (PDAs) and cell-phones, and as home network appliances. Listeners typically build up their own personal libraries of digital songs, which are stored on memory units such as hard disk drives and removable memory cards. Digital songs are typically acquired through the Internet via subscription services and peer-to-peer exchanges, or by converting songs from a compact disc (CD) and importing them into an MP3 library. Acquiring digital music files may infringe copyrights, unless the files are validly obtained through a service that pays royalties to the recording industry.

Digital songs typically include audio data and auxiliary data, referred to as meta-data, used to index the songs within the listener's library. For example, within MP3 files meta-data is accessed through an ID3Tag; WMA files embed meta-data within the files, and also within the filenames themselves. By indexing the songs, a listener can search his library and access individual songs therein. Typically audio players provide a user interface through which users view meta-data.

Barring copyright issues, building up a digital music library requires a lot of time and work. Typically, a listener first searches the Internet for one or more songs of interest, then identifies locations of the songs, and then downloads them into a database associated with a media player. Songs are typically stored as digital files, formatted in compliance with a standard format, such as MP3 or WMA. Once the songs are downloaded, the listener typically uses software such as Windows Media player or Winamp to play the songs on a computer, or alternatively he copies the songs onto a hardware device, such as an iPod™ or MP3 player, that plays the songs.

A shortcoming in the world of digital music is the great effort required to build custom music libraries at home. Often individuals spend nights on end downloading their favorite songs and building their own personal music libraries. An alternative is to either purchase libraries that have been prepared by others, but often someone else's library does not match a listener's taste and the listener prefers to collect his own favorite songs.

A popular source for a listener to hear his favorite songs is on music stations. Cable, satellite broadcast, and the Internet provide music channels for almost every genre of music—classical music, rock and roll, jazz, music of the 80's, etc. A listener can enjoy music according to his taste by subscribing to such broadcast services.

Embodiments of the present invention enable a listener to automatically copy and import songs that are broadcast from a music station into his digital music library, along with the songs' meta-data required for indexing his library. Using embodiments of the present invention a listener, with practically no effort, can automatically build up a large digital music library with tens of thousands of his choice of songs, all properly indexed for search and retrieval. Moreover, an additional feature of embodiments of the present invention enables the listener to select which songs from among those broadcast on the music stations are to be imported into his library, based on one or more of criteria including inter alia genre, song title, artist, album and length of song.

Copying songs that are broadcast from a music station is akin to copying television programs onto a VCR. Copyright law permits a consumer to copy television programs broadcast to his home onto his VCR. The technology for automatically copying songs, however, is more complex since raw audio recording from a music station does not provide the meta-data necessary to identify such songs and incorporate them into a digital music library. Moreover, each song has to be separated out from other songs, because songs are played sequentially on the music station, generally without breaks in between.

Embodiments of the present invention concern a method and system for automatically building digital music libraries from music channels broadcast through cable and satellite stations. For one embodiment of the present invention, broadcast songs are recorded into a digital music library, along with meta-data necessary for indexing and accessing each individual song, and for display while the songs are being played. Using embodiments of the present invention, the digital music library generated from the broadcast music serves as a large library of individual songs, with full search and access capability.

Embodiments of the present invention provide a system that enables the listener to automatically digitally record each broadcast song into a digital music library, and automatically index each song according to genre, song title, artist and album title, as described hereinbelow. Additionally, embodiments of the present invention enable the listener to filter songs to be automatically recorded, by specifying inter alia a genre, song tile or artist, instead of recording all of the broadcast songs. The listener need not be present while the system of embodiments of the present invention is in operation. It may thus be appreciated that embodiments of the present invention enable automatic generation of large libraries of songs.

An embodiment of the invention comprises a programmable device, referred to herein as a "Nest," that can interface with computers, with MP3 players and other digital music players, and with other electronic devices that include MP3 players or other digital music players therewithin, including, inter alia, cell phones, PDAs, home network appliances and Internet appliances. In a first embodiment, the Nest is coupled to a satellite/cable receiver; in a second embodiment, the Nest is coupled to a television; in a third embodiment, the Nest is coupled to various external components via a USB and a Firewire connection.

In all embodiments, the memory storing the digital music library can be either a large hard disk situated within the Nest itself, or one or more smaller removable memory units such as compact disks and memory cards, or a combination of hard disk and removable memory. The advantage of a large hard disk is that the listener's music library is consolidated into a single library that can be searched and accessed in its entirety. The advantage of removable memory units, such as compact disks, is that the listener can insert the disks into portable players such as MP3 players. Assuming that 40 songs on average require 128 MB of data and include one and a half hour's worth of listening, a large 80 GB hard disk can hold a library of approximately 25,600 songs; and a 640 MB compact disk can hold approximately 200 songs, or about 7% hours worth of listening.

Reference is now made to FIG. 1, which is a front view of a Nest 100, in accordance with an embodiment of the present invention. Nest 100 is shown with its front panel open. On the left side of the front panel are female left and right analog audio-in connectors 110 and 120, and female analog video-in connector 130, preferably used for connecting auxiliary audio and video devices, such as a CD player, in order to add content into the Nest. On the right side of the front panel are female USB sockets 140 and 150, preferably used for connecting foreign MP3 players to the Nest; a female Ethernet connector 160, preferably for connecting the Nest to a computer network; and a mini-jack socket 170, preferably used to provide analog stereo audio-out for headphones.

For an embodiment of the present invention, a Nest includes one or more exchange ports 180, also referred to herein as "cradles," through which one or more hand-held digital music players, referred to herein as "Eggs," can be connected to the Nest, for loading songs from a digital music library stored on the Nest thereto. Such exchange ports may be circular or oval ports into which Eggs in the shape of film canisters are inserted. Eggs may be "charged up" with songs while they are plugged into the cradles of the Nest.

Figure 2:
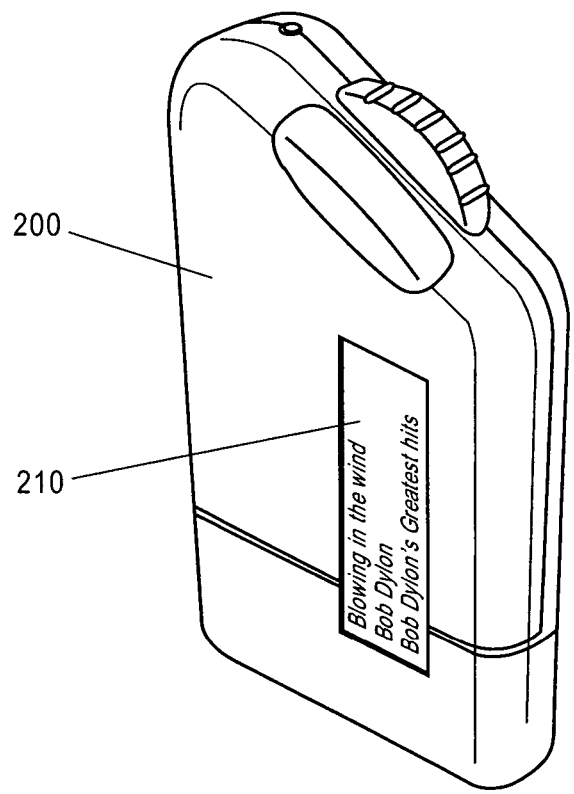
FIG. 2 is a side view of a music player, referred to as an "Egg", in accordance with an embodiment of the present invention.

Reference is now made to FIG. 2, which is a side view of an Egg 200, in accordance with an embodiment of the present invention. Egg 200 is shown with a panel 210 that displays meta-data for a song currently being played. As can be seen in FIG. 2, the meta-data includes a title ("Blowing in the Wind"), an author ("Bob Dylan") and an album ("Bob Dylan's Greatest Hits").

Figure 3:
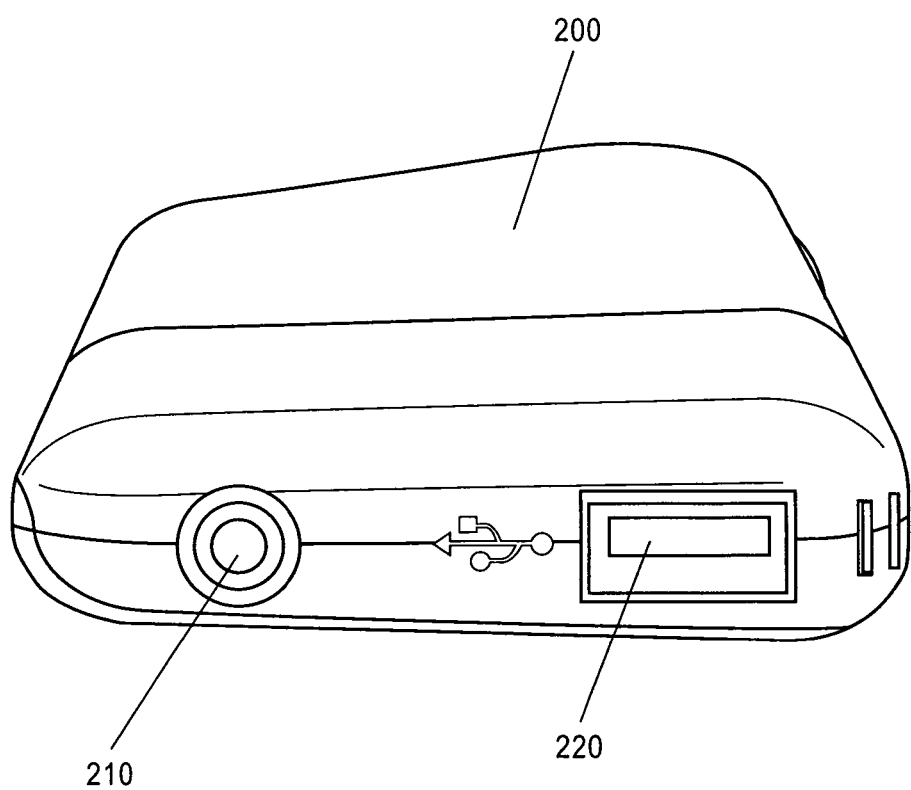
FIG. 3 is bottom view of the music player of FIG. 2, in accordance with an embodiment of the present invention.

Reference is now made to FIG. 3, which is a bottom view of the Egg 200 of FIG. 2, in accordance with an embodiment of the present invention. The bottom of the Egg includes a female audio/video connector 210, preferably for transferring analog audio and analog video between the Egg and a Nest; and a female USB connector 220, preferably for transferring digital data between the Egg and a Nest, between the Egg and a "filling station" kiosk, and between the Egg and another Egg. Corresponding to connectors 210 and 220, the cradles of the Nest contain male analog audio/video connectors and male USB connectors (not shown in FIG. 1).

A typical usage scenario for a Nest and Egg is as follows. A listener sets his cable or satellite receiver box to a specific music channel, preferably from a commercial-free radio station such as The Music Choice®, and activates the Nest to capture songs from the music channel. The Nest automatically creates a digital music library and imports the broadcast songs therein. Thereafter, the listener plugs an Egg into a cradle of the Nest, and downloads selected songs from the music library onto the Egg. If the Nest is connected to the listener's speaker system, then the listener may also pipe music from the Nest into speakers in various rooms. If the Nest is connected to a home network, the listener may stream audio to a computer that is authorized to work with the Nest.

Preferably, in addition to a Nest being able to download songs to the Egg when the Egg is connected to the Nest, the Nest is also able to remove songs stored in the Egg. Thus, if the Egg storage is full, the Nest can remove songs from the Egg, in order for the Egg to download a new set of songs.

Eggs of embodiments of the present invention may receive digital music from other sources, in addition to the Nest. Thus the Eggs may be compatible with kiosks, such as music kiosks located in music distribution stores, used for listening to songs prior to purchase and for subsequent purchase. Preferably, when an Egg is connected to a Nest, the digital music received from other devices and stored within the Egg can be archived on the Nest.

An Egg may receive control commands through its USB connector. Specifically, when connected to a Nest, the Nest may issue control commands to the Egg, such as a command to advance to the next song; and when connected to a docking station, such as a docking station for the Egg in a room of a house, the docking station may receive infrared commands issued by a user, and translate them into control commands to the Egg over the USB connector.

Figure 4:
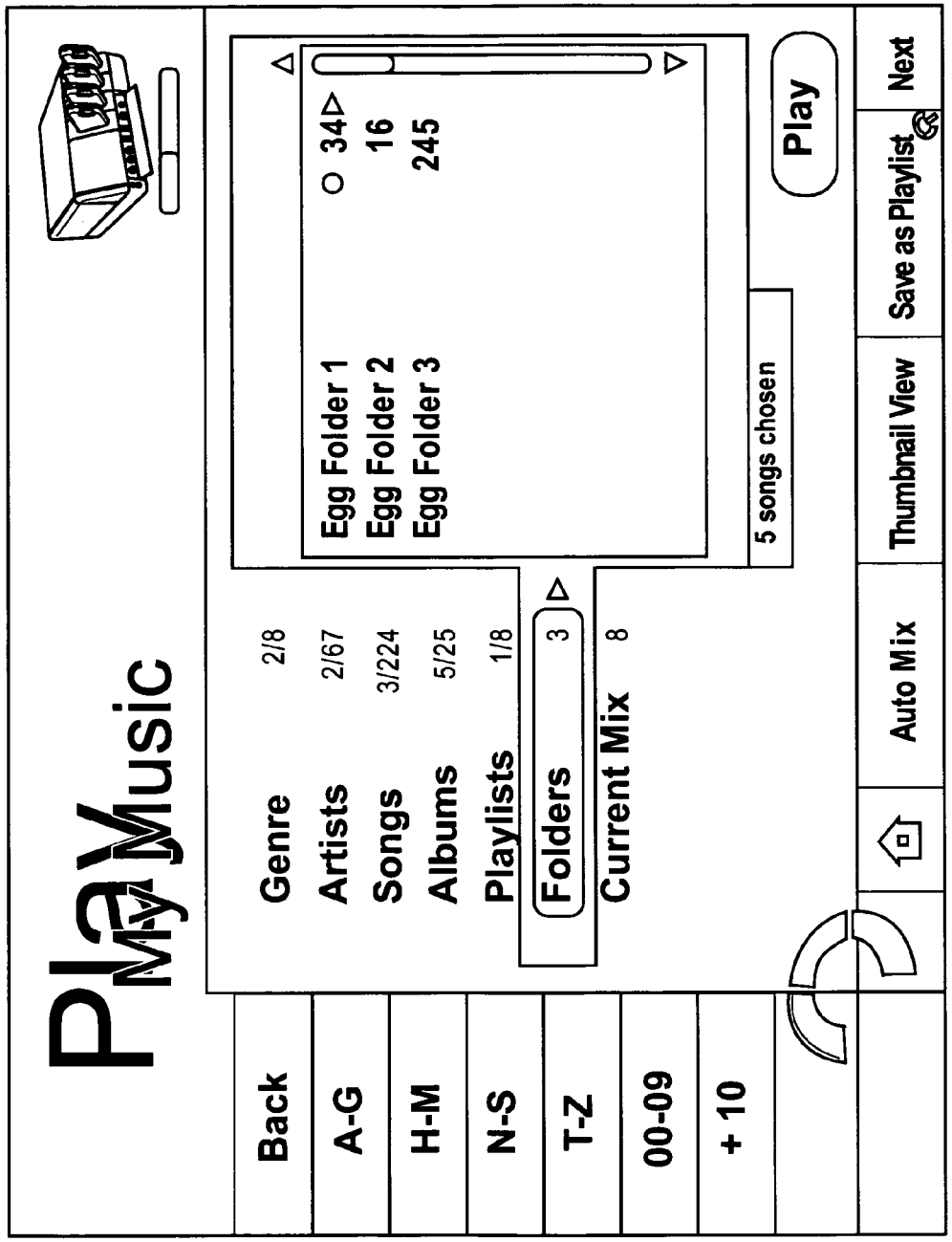
FIG. 4 is an illustration of a user interface for copying songs from the digital archive of FIG. 1 into the music player of FIG. 2, in accordance with an embodiment of the present invention.

Reference is now made to FIG. 4, which is an illustration of a graphical user interface (GUI) for copying songs from the Nest of FIG. 1 into the Egg of FIG. 2, in accordance with an embodiment of the present invention. The GUI shown in FIG. 4 is preferably displayed on a television or other display device connected to the Nest, and interacted with through use of a remote control device, such as an infrared control unit. As such, the GUI of FIG. 4 is intended for navigation with simple directional buttons and a select button.

The GUI shown in FIG. 4 is used to organize a digital music library and create playlists—i.e., sequences of songs for playing from the Nest—or for copying to an Egg for playback from the Egg.

Copyright Management

In an enhanced embodiment of the present invention incorporates digital rights management. In accordance with an embodiment of the present invention, an Egg is registered with at most one Nest, and only Eggs registered with a Nest have the right to check-out non-promotional songs therefrom, as described hereinbelow. Typically, a Nest will have multiple Eggs registered with the Nest.

In accordance with a preferred embodiment of the present invention, a song within a Nest or an Egg is labeled as "Purchased", "Recorded" or "Try & Buy". A "Purchased" song is one that is paid for by a consumer. Purchased songs include inter alia songs purchased through an Internet service such as iTunes® or Napster®, songs purchased through a kiosk, and songs copied and converted ("ripped") to a format such as MP3 from a CD that is purchased. "Recorded" songs include songs recorded for a consumer from a cable or satellite music station. "Try & Buy" songs are promotional or trial versions of songs that are provided to a consumer for free, and eventually expire. If the consumer wishes to continue to listen to such songs, he must obtain a Purchased or Recorded version of the song. "Purchased" labels are also referred to herein as "Owned-by-Purchase" labels, and "Recorded" labels are also referred to herein as "Owned-by-Recording" labels. In addition, "Purchased" and "Recorded" labels are also referred to herein collectively as "Ownership" labels, and "Try & Buy" labels are also referred to herein as "Non-Ownership" labels.

Expiration of a Try & Buy song may occur, inter alia, after a fixed time period, such as thirty days, or after a fixed number of playbacks of the song. Upon expiration, a Try & Buy song may cease to play altogether, or may play only a downsampled version of the song or a header of the song, or may instead play a message explaining how to purchase the song, or otherwise enable purchase of the song.

Preferably, the label of a Try & Buy song includes a URL or other such identifier for one or more web sites that serve as a clearinghouse through which the song can be purchased.

In accordance with an embodiment of the present invention, the Nest includes a list of songs that are already contained within the Nest and songs that are not already contained within the Nest. For example, whenever a song from a specific album by a specific artist is contained within the Nest, the list includes other songs from the same album or other songs by the same artist. Songs that have been recorded within the Nest are labeled as Recorded. Other songs, not contained within the Nest, can preferably be downloaded to the Nest as trial Try & Buy versions, upon request by a consumer. After listening to a Try & Buy version of a song, the consumer may purchase the song using the Nest, and the purchased song is then labeled as Purchased. Such labeling of a song as Recorded, Purchased or Try & Buy serves to identify the copyrights associated with the song.

Preferably, when a song is copied from one device to another device where the two devices are registered with one another, such as from a Nest to an Egg that is registered with the Nest, or from an Egg to a Nest that the Egg is registered with, the label of the song is maintained; i.e., the label of the song on the target device is set to the label of the song on the source device. For example, if a Try & Buy song is copied from a Nest to an Egg that is registered with the Nest, and then to another Egg that is also registered with the same Nest, then the song is labeled as Try & Buy on the two Eggs. Similarly, if an Egg is used to purchase a song from a kiosk and the song is subsequently copied to a Nest that the Egg is registered with, then the song is labeled as Purchased on the Egg and on the Nest.

Preferably, when a song is copied from one device to another device where the two devices are not registered with one another, such as from a Nest to an Egg or from an Egg to a Nest, where the Egg is not registered with the Nest, then regardless of the label of the song on the source device, the song is labeled as Try & Buy on the target device.

Table I summarizes the copyright labeling of a song on a target device.

TABLE I

Copyright Label of Song on Target Device with One Embodiment

| Source Device → Target Device | Source Label → Target Label |
|---|---|
| Nest → Egg registered with the Nest OR Egg registered with Nest → Nest OR Egg → Egg, both Eggs registered with the same Nest | Purchased → Purchased Recorded → Recorded Try & Buy → Try & Buy |
| Nest → Egg not registered with the Nest OR Egg not registered with Nest → Nest OR Egg → Egg, Eggs registered with the different Nests | Purchased → Try & Buy Recorded → Try & Buy Try & Buy → Try & Buy |
| Cable/satellite broadcast → Nest | → Recorded |
| CD or other recording media (optical, magnetic, etc.) → Nest | |
| CD or other recording media (optical, magnetic, etc.) → Egg | → Purchased |
| Internet music service (iTunes ®, Napster ®) → Nest | |
| Music kiosk → Egg | |

The logic of table I assumes that any two devices can determine whether or not they are commonly registered. This capability can be achieved, for example, if the registration information is built into a Nest and an Egg at the time of manufacture.

In addition to the logic of Table I, the label of a song within a Nest of an Egg is changed from Try & Buy to Purchased if a user purchases the song from a clearinghouse, using the Nest or the Egg, respectively.

In a first alternative embodiment of the present invention, the Nest can directly determine whether an Egg is registered with it, but an Egg cannot directly determine whether it is registered with a Nest, or whether it and another Egg are registered to the same Nest. This occurs, for example, if an Egg has the capability of registering itself with any one of a plurality of Nests after it is manufactured. In this latter case, the logic of Table I is modified so that whenever a song is copied from a source Egg to a target Egg, the song is labeled as Try & Buy in the target Egg. Accordingly, the copyright labeling of a song on a target device follows Table II.

TABLE II

Copyright Label of Song on Target Device with First Alternate Embodiment

| Source Device → Target Device | Source Label → Target Label |
|---|---|
| Nest → Egg registered with the Nest OR<br>Egg registered with Nest → Nest | Purchased → Purchased<br>Recorded → Recorded<br>Try & Buy → Try & Buy |
| Nest → Egg not registered with the Nest OR<br>Egg not registered with Nest → Nest OR<br>Egg → Egg | Purchased → Try & Buy<br>Recorded → Try & Buy<br>Try & Buy → Try & Buy |
| Cable/satellite broadcast → Nest<br>CD or other recording media (optical, magnetic, etc.) → Nest | → Recorded |
| CD or other recording media (optical, magnetic, etc.) → Egg<br>Internet music service (iTunes ®, Napster ®) → Nest<br>Music kiosk → Egg | → Purchased |

In this first alternative embodiment, an egg that is registered with a first Nest may be re-registered with a second Nest. In such case, the Egg is no longer registered with the first Nest. Preferably, there is a limit to the number of times an Egg can be re-registered, and after an Egg re-registers itself a maximum number of times, it is blocked from further re-registration.

In a second alternative embodiment of the present invention, the distinction between Purchased and Recorded songs is ignored, and both are identified as "Owned" songs. In this second alternative embodiment, the copyright labeling of a song on a target device follows Table III.

TABLE III

Copyright Label of Song on Target Device with Second Alternate Embodiment

| Source Device → Target Device | Source Label → Target Label |
|---|---|
| Nest → Egg registered with the Nest OR<br>Egg registered with Nest → Nest OR<br>Egg → Egg, both Eggs registered with the same Nest | Owned → Ownmed<br>Try & Buy → Try & Buy |
| Nest → Egg not registered with the Nest OR<br>Egg not registered with Nest → Nest OR<br>Egg → Egg, Eggs registered with the different Nests | Owned → Try & Buy<br>Try & Buy → Try & Buy |
| Cable/satellite broadcast → Nest<br>CD or other recording media (optical, magnetic, etc.) → Nest | → Owned |
| CD or other recording media (optical, magnetic, etc.) → Egg<br>Internet music service (iTunes ®, Napster ®) → Nest<br>Music kiosk → Egg | → Owned |

In yet a third alternative embodiment of the present invention, copying of songs from a Nest to multiple Eggs, each of which is registered with the Nest, is restricted. This third alternative embodiment has a more elaborate logic than the other embodiments. In order to best describe this logic, the terms "checking-out" and "checking-in" of songs are used as follows. When an Egg is connected to a Nest in order to download songs from the Nest to the Egg, this is referred to herein as "checking-out" of songs. When an Egg is connected to a Nest in order to remove songs stored in the Egg, this is referred to herein as "checking-in" of songs.

Often the same song can be broadcast multiple times from a cable or satellite music station, while the Nest is operational to record the broadcast songs. For an embodiment of the present invention, the Nest stores a count for each Recorded song, which is incremented when the Nest encounters a broadcast song that has already been recorded onto the Nest archive. Such count thus corresponds to the total number of times the Recorded song has been broadcast while the Nest was recording, and is denoted henceforth as max_permitted_copies. For example, if a Recorded song is re-played five times on the Music Channel while the Nest is recording from the Music Channel, then max_permitted_copies=5 for such song.

The max_permitted_copies count for a Recorded song is used to restrict the number of different Eggs that the Nest allows to check-out the song. For example, if max_permitted_copies=5 for a Recorded song, then at most five different Eggs can check-out the song from the Nest. That is, for each Recorded song in its archive, the Nest stores a count for each song, which is incremented when an Egg checks-out the song. Such count corresponds to the number of Eggs that have checked-out the song, and is denoted henceforth as number_copies_checked_out. For example, if three Eggs have checked-out the same Recorded song from the Nest, then number_copies_checked_out=3 for such song.

In accordance with an embodiment of the present invention, when an Egg checks-in a Recorded song with the Nest, thereby removing the song from the Egg, the number_copies_checked_out count is decremented. For example, if number_copies_checked_out=3 for a Recorded song and an Egg that checked-out the song subsequently checks-in the song, then number_copies_checked_out is decremented to 2 for such song.

Figure 5:
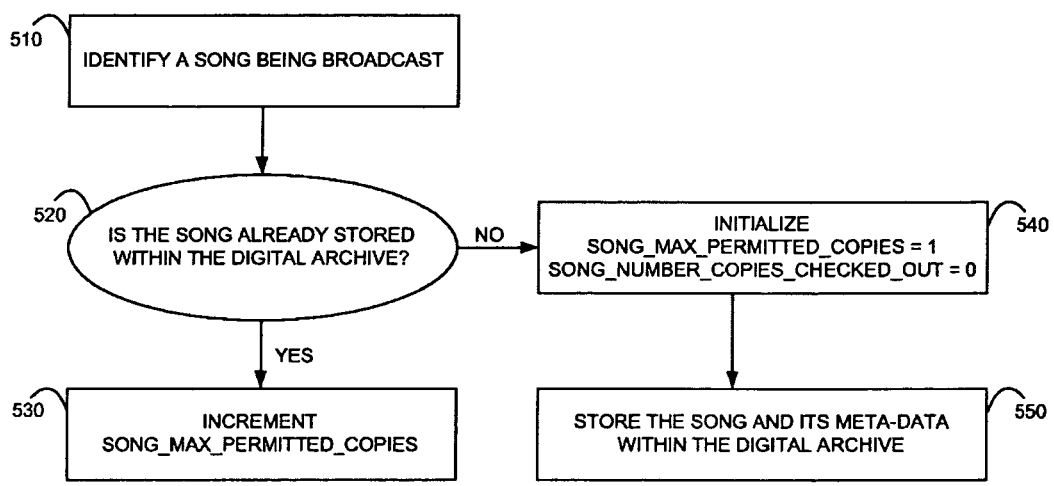
FIG. 5 is a simplified flowchart of a method for "checking-out" songs from the digital archive of FIG. 1 to the music player of FIG. 2, in accordance with an embodiment of the present invention.

Reference is now made to, FIG. 5 which is a simplified flowchart of a method for tracking the number of times the same song is broadcast while the Nest 100 of FIG. 1 is recording music, in accordance with an embodiment of the present invention. At operation 510 the Nest identifies a song being broadcast from a cable or satellite station that is currently being recorded by the Nest. At operation 520 the Nest determines whether or not the song is already stored within the Nest's digital archive. If so, then at operation 530 the Nest increments max_permitted_copies by one. Otherwise, at operation 540 the Nest initializes max_permitted_copies=1 for the song, and number_copies_checked_out=0 for the song. At operation 550 the Nest stores the Recorded song and its meta-data within the Nest's digital archive.

Figure 6:
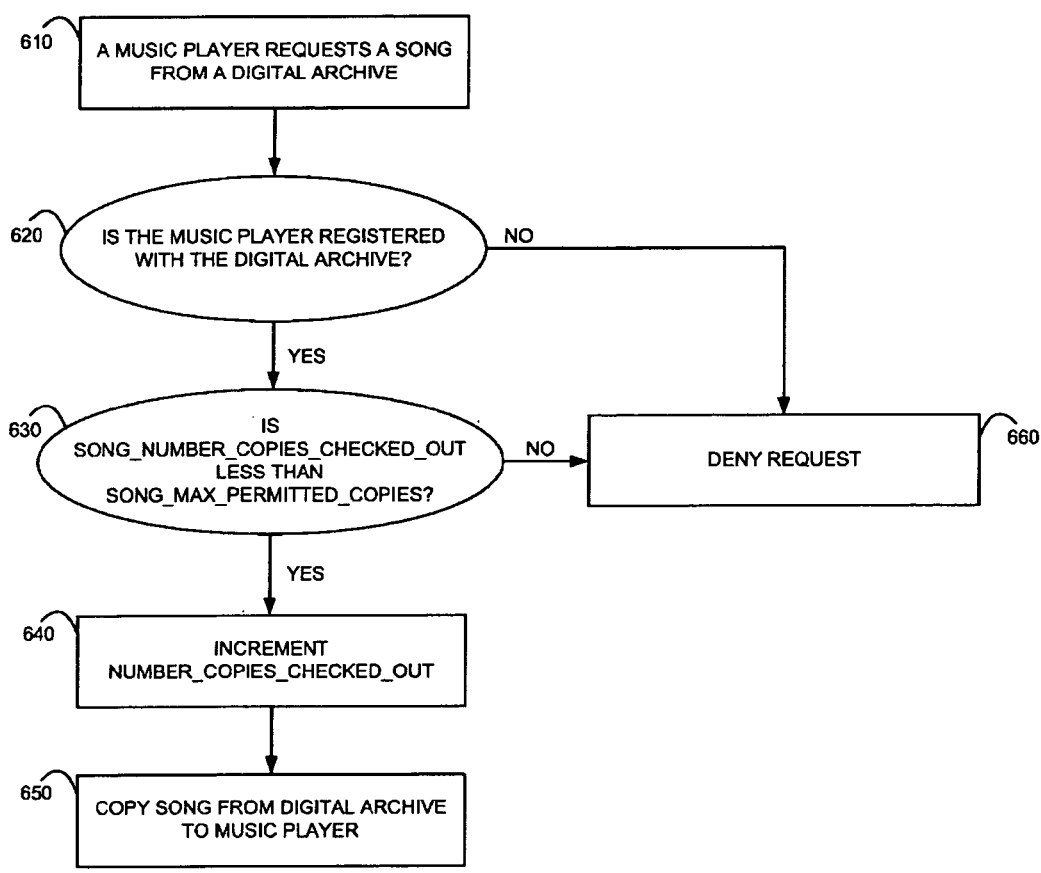
FIG. 6 is a simplified flowchart of a method for "checking-in" songs from the music player of FIG. 2 to the digital archive of FIG. 1, in accordance with an embodiment of the present invention.

Reference is now made to FIG. 6, which is a simplified flowchart of a method for "checking-out" Recorded songs from the Nest of FIG. 1 to the Egg of FIG. 2, in accordance with an embodiment of the present invention. At operation 610 an Egg that is connected to a cradle in a Nest requests to copy a Recorded song from the Nest to the Egg. At operation 620 the Nest determines whether or not the Egg is registered with the Nest. If so, then at operation 630 the Nest determines whether number_copies_checked_out is less than max_permitted_copies for the requested song. If so, then at operation 640 the Nest increments number_copies_checked_out for the song by one, and at operation 650 the Nest permits the Egg to copy the song from the Nest to the Egg.

If, at operation 620 the Nest determines that the Egg is not registered with the Nest, or if, at operation 630, the Nest determines that number_copies_checked_out is equal to max_permitted_copies, then the Egg's request for the Recorded song is denied at operation 660. Alternatively, the Recorded song may be copied onto the Egg as a trial version, and labeled Try & Buy.

Figure 7:
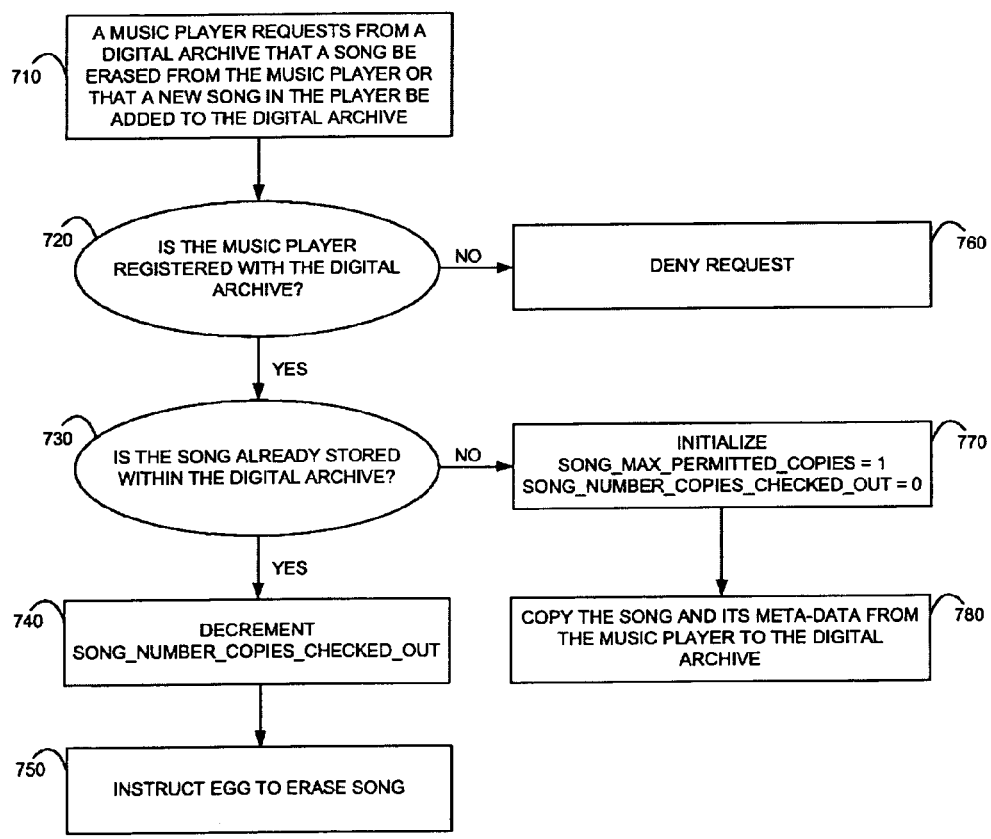
FIG. 7 is a simplified flowchart of a method for tracking the number of times the same song is broadcast while the digital archive of FIG. 1 is recording music, in accordance with an embodiment of the present invention.

Reference is now made to FIG. 7, which is a simplified flowchart of a method for "checking-in" Recorded songs from the Egg of FIG. 2 to the Nest of FIG. 1, in accordance with an embodiment of the present invention. At operation 710 an Egg connected to a cradle in a Nest requests to check-in a Recorded song. At operation 720 the Nest determines whether or not the Egg is registered with the Nest. If so, then at operation 730 the Nest determines whether or not the song already resides within the Nest's digital archive. If so, then at operation 740 the Nest decrements number_copies_checked_out for the song by one, and at operation 750 the Nest instructs the Egg to erase the song from the Egg.

If at operation 720 the Nest determines that the Egg is not registered with the Nest, then the Egg's request to check-in the song is denied at operation 760. Alternatively, the song may be copied onto the Nest as a trial version, and labeled Try & Buy. If at operation 730 the Nest determines that the song does not currently reside within its digital archive, then this indicates that the Egg obtained the song from another source, such as from a kiosk. As such, at operation 770 the Nest initializes max_permitted_copies=1 for the song, and number_copies_checked_out=0 for the song. At operation 780 the Nest copies the song and its meta-data from the Egg into the Nest's digital archive.

Preferably, when a Recorded song is copied from a first Egg to a second Egg in this embodiment, the song is labeled as Try & Buy on the second Egg, even if the first and second Egg are both registered to the same Nest.

Purchased songs may also be restricted for copying to multiple Eggs with similar logic, by setting max_permitted_copies=1.

In general, it may now be appreciated by those skilled in the art that embodiments of the present invention support a general digital rights configuration, by means of rules that specify whether or not a song residing on a source device has requisite permission for copying to a target device and, if so, how the song should be labeled when copied to the target device. Such rules may be embodied within functions mayBeCopied(srcDeviceType, trgtDeviceType, isRegistered, srcDeviceLabel), trgtLabel(srcDeviceType, trgtDeviceType, isRegistered, srcLabel), where srcDeviceType and trgtDeviceType are device specific parameters:

srcDeviceType indicates the type of the source device in which the digital song resides, including inter alia Nest and Egg; and trgtDeviceType indicates the type of the target device onto which the digital song is to be copied, including inter alia Nest and Egg;

where isRegistered is specific to a pair of devices:

isRegistered indicates whether or not the source device and target device are commonly registered;

where srcLabel and trgtLabel are both song and device specific parameters:

srcLabel indicates the label of the song on the source device, including inter alia Recorded, Purchased and Try & Buy or, alternatively, Owned and Try & Buy; and trgtLabel indicates the label of the song on the target device, including inter alia Recorded, Purchased and Try & Buy or, alternatively, Owned and Try & Buy; and where:

mayBeCopied indicates whether or not the song may be copied from the source device to the target device.

More generally, as described hereinabove, the functions mayBeCopied( ) and trgtLabel( ) may have additional parameters max_permitted_copies and number_copies_checked_out, where max_permitted_copies and number_copies_checked_out are both song and device specific parameters:

max_permitted_copies indicates the maximum number of copies of the song that are permitted from the device; and number_copies_checked_out indicates the current number of copies of the song that have been made from the device.

It may be appreciated by those skilled in the art that alternatively the functions mayBeCopied( ) and trgtLabel( ) may be embodied as tables or other data structures.

Figure 8:
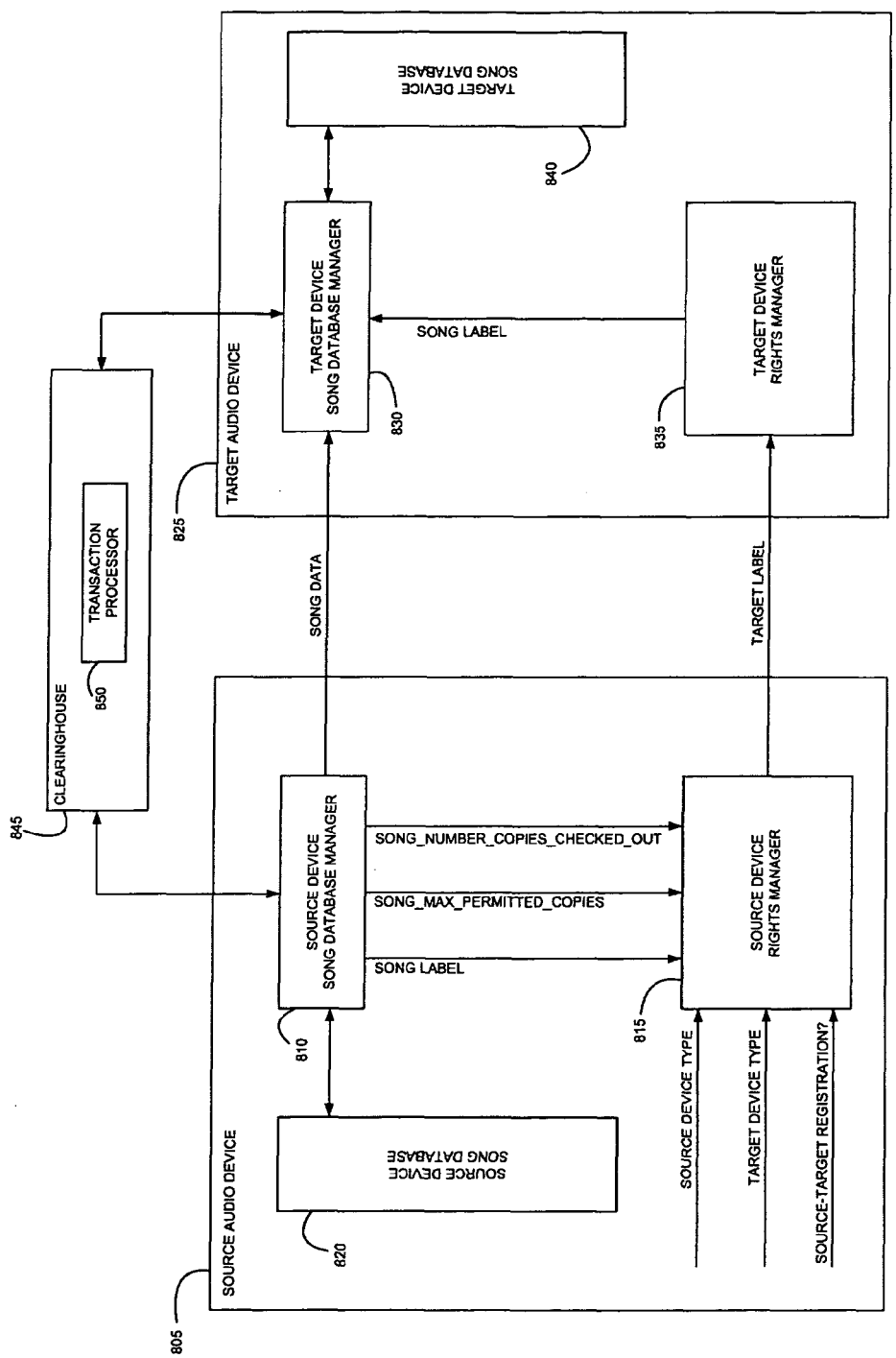
FIG. 8 is a simplified block diagram of a digital rights management system, in accordance with an embodiment of the present invention.

Reference is now made to FIG. 8, which is a simplified block diagram of a digital rights management system in accordance with an embodiment of the present invention. Shown in FIG. 8 is a source device 805 including a database manager 810 and a rights manager 815. Database manager 810 preferably controls a database 820 that stores digital songs and meta-data associated therewith. Preferably, the meta-data includes a label for each song, indicating whether the song is Purchased, Recorded or Try & Buy, as described hereinabove. Optionally, the meta-data may also include max_permitted_copies and number_copies_checked_out for one or more songs. The songs, their labels, and their max_permitted_copies and number_copies_checked_out parameters are accessible through database manager 810.

It may be appreciated by those skilled in the art that digital songs and their meta-data may be stored in one or more database tables, within database 820, that can be joined.

Alternatively, the binary song data may be stored in memory locations outside of database 820, and pointed to by address entries in database 820. It may also be appreciated that database 820 may instead be structured as a plurality of databases.

Also shown in FIG. 8 is a target device 825, including its own database manager 830, rights manager 835, and database 840.

Rights manager 815 determines whether or not a song resident on source device 810 may be copied to a specified target device, such as target device 825. If copying of the song is permitted, then rights manager 815 further determines a label to be used for the song on the target device, referred to as the target label. In accordance with an embodiment of the present invention, rights manager 815 bases its determination on (i) the type of source device 805, (ii) the type of target device 825, (iii) the label of the song on source device 805, and (iv) the max_permitted_copies and number_copies_checked_out parameters for the song on source device 805. Rights manager 815 preferably implements functions such as mayBeCopied( ) and trgtLabel( ) described hereinabove.

After rights manager 815 determines the target label, it transmits the song and the target label to target device 825. Target device 825 preferably adds the song to its database 840 and labels the song in database 840 according to the target label.

Also shown in FIG. 8 is a clearinghouse 845 for purchasing songs. Source device 805 and target device 825 may purchase songs directly from clearinghouse 845. For songs not currently resident on source device 805 or target device 825, clearinghouse 845 preferably sends the songs to the device that purchases them. For songs currently resident on source device 805 or target device 825 labeled Try & Buy, clearinghouse 845 preferably sends an authorization to source database manager 810 or target database manager 830 to change the label of the songs from Try & Buy to Purchased. Clearinghouse 845 preferably includes a transaction processor 850, which enables a user to purchase rights to songs and verifies the user's payment. Upon completion of a user's purchase of a song by transaction processor 850, clearinghouse 845 sends the songs to the user's device, or sends an authorization to the user's device to change the label of the song, as appropriate.

In accordance with an embodiment of the present invention, clearinghouse 845 also freely distributes Try & Buy versions of songs, which can be converted to Purchased versions at a later date, if a user so desires.

Preferably, clearinghouse 845 is administered by an entity that has distribution privileges for the songs it sells, such as a cable or satellite company.

Figure 9:
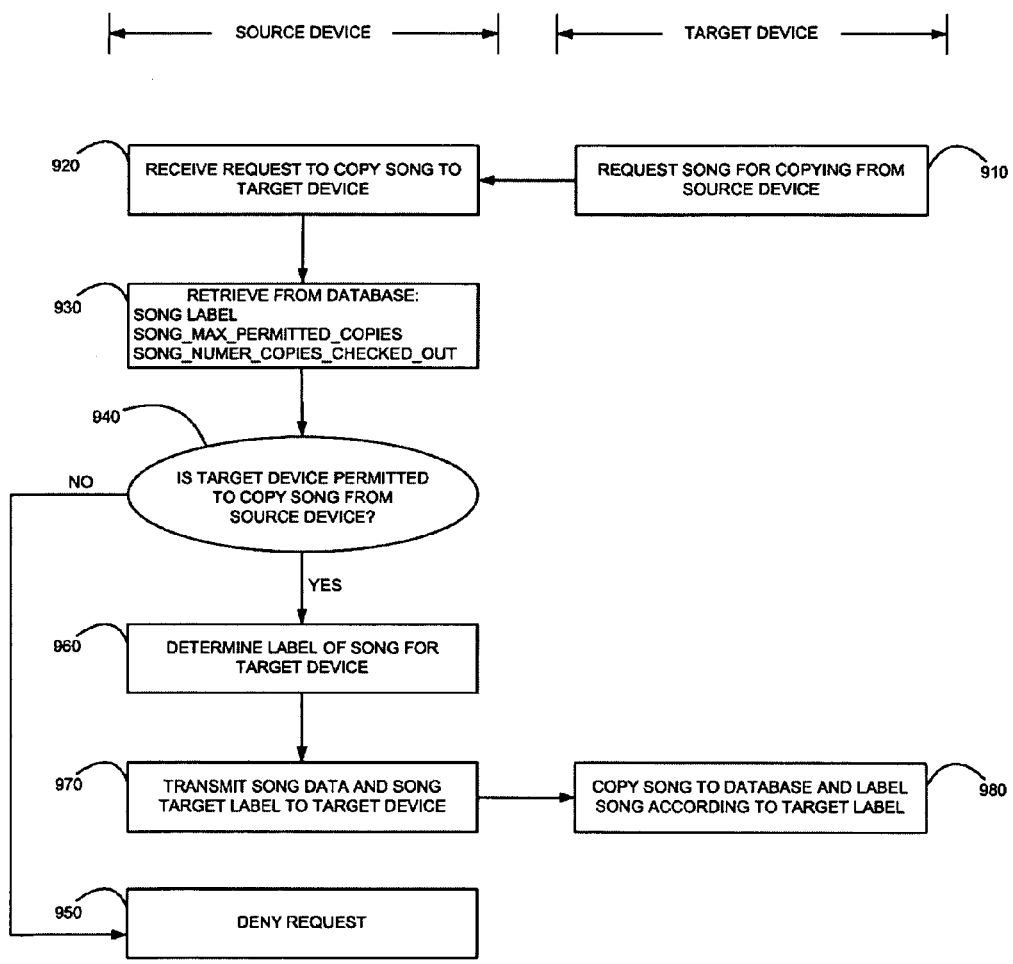
FIG. 9 is a simplified flow chart for a digital rights management system, in accordance with an embodiment of the present invention.

Reference is now made to FIG. 9, which is a simplified flow chart for a digital rights management system, in accordance with an embodiment of the present invention. As can be seen, FIG. 9 is divided into two columns, the leftmost column indicating operations performed by a source audio device, such as source device 805 (FIG. 8) and the rightmost column indicating operations performed by a target audio device, such as target device 825.

At operation 910 the target device requests a song to be copied from the source device. At operation 920 the source device receives the request and identifies the target device. In particular, the source device determines the type of the target device, and whether or not the source and target device are registered with one another.

At operation 930 the source device determines the label for the requested song, and the max_permitted_copies and number_copies_checked_out parameters for the requested song. Preferably, this information is contained within a source device database, such as database 820 (FIG. 8). At operation 940 the source device determines whether or not the target device has permission to copy the song. Preferably such determination is made by a rights manager within the source device, such as rights manager 815. If it is determined at operation 940 that the target device does not have permission to copy the song from the source device, then at operation 950 source device denies the copy request. Otherwise, if it is determined at operation 940 that the target device does have permission to copy the song from the source device, then at operation 960 the source device determines how to label the song within the target device. Preferably, such determination is also made by a rights manager, such as rights manager 815.

At operation 970 the source device transmits the requested song and its label to the target device, and at operation 980 the target device copies the requested song to its database, and labels the requested song accordingly.

In reading the above description, persons skilled in the art will realize that there are many apparent variations that can be applied to the methods and systems described. Thus, the configurable logic described hereinabove for songs and audio devices is applicable as well to movies and video devices, and to other types of media and media devices. As such, the respective terms "audio device", "digital songs", "source audio device", "target audio device", "digital audio acquisition device" and "digital audio player" as used through the specification for the specific embodiment related to digital audio, are to be construed respectively generally as "content device", "media content", "source content device", "target content device", "content acquisition device" and "content player".

Transfer of songs from source devices to target devices, and from clearinghouses to devices, may be performed in batches of songs, such as entire albums, as well as for single songs. In addition, devices may be "hot-synched" to one another. For example, an Egg may be hot-synched to a Nest, using wired or wireless communication, so that the Nest is updated periodically with the songs in the Egg.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A method for managing rights for digital music, comprising:

registering groups of digital audio devices from among a plurality of digital audio devices with one another, each digital audio device able to store digital songs, to play the digital songs stored therein, and to copy the digital songs stored therein to another digital audio device;

labeling the digital songs stored within the digital audio devices, from a plurality of labels including an ownership label and a non-ownership label, wherein a non-ownership label of a digital song comprises conditions under which playing of the digital song is not allowed, comprising:

(d.1) determining that a first designated digital song bearing an ownership label in a first source digital audio device may be copied to a first target digital audio device that is registered with the first source digital audio device;

prescribing the label of the first designated digital song for the first target digital audio device to be an ownership label, in response to said (d.1);

(d.2) determining that a second designated digital sung bearing a non-ownership label in a second source digital audio device may be copied to a second target digital audio device that is registered with the second source digital audio device;

(d.3) determining that a third designated digital song bearing an ownership label in a third source digital audio device may be copied to a third target digital audio device that is not registered with the third source digital audio device;

(d.4) determining that a fourth designated digital song bearing a non-ownership label in a fourth source digital audio device may be copied to a fourth target digital audio device that is not registered with the fourth source digital audio device; and prescribing the label of the second, third and fourth designated digital song for the respective second, third and fourth target digital audio device to be a non-ownership label, in response to said (d.2), (d.3) and (d.4), respectively;

receiving a request to play a designated song in a digital audio device;

identifying the label of the designated song in the digital audio device as being a non-ownership label; and denying the request to play the designated song in response to said identifying, in accordance with the conditions of the non-ownership label.

2. The method of claim 1 wherein at least one non-ownership label is a trial version label, and wherein said prescribing the label of the fourth designated digital song for the fourth target digital audio device to be a non-ownership label comprises prescribing the label of the designated digital song for the target digital audio device to be a trial version label.

3. The method of claim 1 wherein the digital audio devices include digital audio recorders.

4. The method of claim 1 wherein at least one ownership label is an owned-by-purchase label.

5. The method of claim 1 wherein at least one ownership label is an owned-by-recording label.

6. A non-transitory computer-readable storage medium storing program code for causing a device to perform a method comprising:

registering groups of digital audio devices from among a plurality of digital audio devices with one another, each digital audio device able to store digital songs, to play the digital songs stored therein, and to copy the digital songs stored therein to another digital audio device; and labeling the digital songs stored within the digital audio devices, from a plurality of labels including an ownership label and a non-ownership label, wherein a non-ownership label of a digital song comprises conditions under which playing of the digital song is not allowed, comprising:

(d.1) determining that a first designated digital song bearing an ownership label in a first source digital audio device may be copied to a first target digital audio device that is registered with the first source digital audio device; and prescribing the label of the first designated digital song for the first target digital audio device to be an ownership label, in response to said (d.1);

(d.2) determining that a second designated digital song bearing a non-ownership label in a second source digital audio device may be copied to a second target digital audio device that is registered with the second source digital audio device;

(d.3) determining that a third designated digital song bearing an ownership label in a third source digital audio device may be copied to a third target digital audio device that is not registered with the third source digital audio device;

(d.4) determining that a fourth designated digital song bearing a non-ownership label in a fourth source digital audio device may be copied to a fourth target digital audio device that is not registered with the fourth source digital audio device; and prescribing the label of the second, third and fourth designated digital song for the respective second, third and fourth target digital audio device to be a non-ownership label, in response to said (d.2), (d.3) and (d.4), respectively;

receiving a request to play a designated song in a digital audio device;

identifying the label of the designated song in the digital audio device as being a non-ownership label; and denying the request to play the designated song in response to said identifying, in accordance with the conditions of the non-ownership label.

7. A system for managing rights for digital music, comprising:

a plurality of digital audio devices, each digital audio device able to store digital songs, to play the digital songs stored therein, and to copy the digital songs stored therein to another digital audio device, wherein groups of the digital audio devices are registered with one another, wherein each digital song stored in each digital audio device has a label that is an ownership label or a non-ownership label, and wherein a non-ownership label of a digital song comprises conditions under which playing of the digital song is not allowed, each digital audio device comprising:

a rights processor for
receiving a request to play a designated song;
identifying the label of the designated song as being a non-ownership label; and
denying the request to play the designated song in response to said identifying, in accordance with the conditions of the non-ownership label; and a rights manager for labeling a digital song copied to another digital audio device, by (d.1) determining that a first designated digital song bearing an ownership label may be copied to a first target digital audio device that is registered with the digital audio device, prescribing the label of the first designated digital song for the first target digital audio device to be an ownership label, in response to (d.1), (d.2) determining that a second designated digital song bearing a non-ownership label may be copied to a second target digital audio device that is registered with the digital audio device, (d.3) determining that a third designated digital song bearing an ownership label may be copied to a third target digital audio device that is not registered with the digital audio device, (d.4) determining that a fourth designated digital song bearing a non-ownership label may be copied to a fourth target digital audio device that is not registered with the digital audio device, and prescribing the label of the second, third and fourth designated digital song for the respective second, third and fourth target digital audio device to be a non-ownership label, in response to (d.2), (d.3) and (d.4), respectively.

8. The system of claim 7 wherein at least one non-ownership label is a trial version label, and wherein said rights manager prescribes the label of the fourth designated digital song for the fourth target digital audio device to be a trial version label.

9. The system of claim 7 wherein the digital audio devices include digital audio recorders.

10. The system of claim 7 wherein at least one ownership label is an owned-by-purchase label.

11. The system of claim 7 wherein at least one ownership label is an owned-by-recording label.

12. A method for managing rights for digital music, comprising:
registering groups of digital audio devices, from among a plurality of digital audio devices, with one another, each digital audio device able to store digital songs and to copy the digital songs to another digital audio device, and the digital audio devices comprising acquisition devices and players;
labeling the digital songs stored within the digital audio devices, from a plurality of labels including an ownership label and a non-ownership label, wherein a non-ownership label of a digital song comprises conditions under which playing of the digital song is not allowed, comprising:
  (d.1) determining that a first designated digital song bearing an ownership label in a first source digital audio device that is an acquisition device may be copied to a first target digital audio device that is registered with the first source digital audio device;
  (d.2) determining that a second designated digital song bearing an ownership label in a second source digital audio device that is a player may be copied to a second target digital audio device that is an acquisition device and that is registered with the second source digital audio device;
  prescribing the label of the first and second designated digital song for the respective first and second target digital audio device to be an ownership label, in response to said (d.1) and (d.2), respectively;
  (d.3) determining that a third designated digital song bearing an ownership label in a third source digital audio device that is a player may be copied to a third target digital audio device that is a player and that is registered with the third source digital audio device;
  (d.4) determining that a fourth designated digital song bearing a non-ownership label in a fourth source digital audio device may be copied to a fourth target digital audio device that is registered with the fourth source digital audio device;
  (d.5) determining that a fifth designated digital song bearing an ownership label in a fifth source digital audio device may be copied to a fifth target digital audio device that is not registered with the fifth source digital audio device;
  (d.6) determining that a sixth designated digital song bearing a non-ownership label in a sixth source digital audio device may be copied to a sixth target digital audio device that is not registered with the sixth source digital audio device; and
  prescribing the label of the third, fourth, fifth and sixth designated digital song for the respective third, fourth, fifth and sixth target digital audio device to be a non-ownership label, in response to said (d.3), (d.4), (d.5) and (d.6), respectively;
receiving a request to play a designated song in a player;
identifying the label of the designated song in the player as being a non-ownership label; and
denying the request to play the designated song in response to said identifying, in accordance with the conditions of the non-ownership label.

13. The method of claim 12 wherein at least one non-ownership label is a trial version label, and wherein said prescribing the label of the third, fifth and sixth designated digital song for the respective third, fifth and sixth target digital audio device to be a non-ownership label comprises prescribing the label to be a trial version label.

14. The method of claim 12 wherein at least one ownership label is an owned-by-purchase label.

15. The method of claim 12 wherein at least one ownership label is an owned-by-recording label.

16. A non-transitory computer-readable storage medium storing program code for causing a device to perform a method comprising:
registering groups of digital audio devices, from among a plurality of digital audio devices, with one another, each digital audio device able to store digital songs and to copy the digital songs to another digital audio device, and the digital audio devices comprising acquisition devices and players;
labeling the digital songs stored within the digital audio devices, from a plurality of labels including an ownership label and a non-ownership label, wherein a non-ownership label of a digital song comprises conditions under which playing of the digital song is not allowed, comprising:
  (d.1) determining that a first designated digital song bearing an ownership label in a first source digital audio device that is an acquisition device may be copied to a first target digital audio device that is registered with the first source digital audio device;
  (d.2) determining that a second designated digital song bearing an ownership label in a second source digital audio device that is a player may be copied to a second target digital audio device that is an acquisition device and that is registered with the second source digital audio device;
  prescribing the label of the first and second designated digital song for the respective first and second target digital audio device to be an ownership label, in response to said (d.1), and (d.2), respectively;
  (d.3) determining that a third designated digital song bearing an ownership label in a third source digital audio device that is a player may be copied to a third target digital audio device that is a player and that is registered with the third source digital audio device;
  (d.4) determining that a fourth designated digital song bearing a non-ownership label in a fourth source digital audio device may be copied to a fourth target digital audio device that is registered with the fourth source digital audio device;
  (d.5) determining that a fifth designated digital song bearing an ownership label in a fifth source digital audio device may be copied to a fifth target digital audio device that is not registered with the fifth source digital audio device;
  (d.6) determining that a sixth designated digital song bearing a non-ownership label in a sixth source digital audio device may be copied to a sixth target digital audio device that is not registered with the sixth source digital audio device; and prescribing the label of the third, fourth, fifth and sixth designated digital song for the respective third, fourth, fifth and sixth target digital audio device to be a non-ownership label, in response to said (d.3), (d.4), (d.5) and (d.6), respectively;

receiving a request to play a designated song in a player;

identifying the label of the designated song in the player as being a non-ownership label; and denying the request to play the designated song in response to said identifying, in accordance with the conditions of the non-ownership label.

17. A system for managing rights for digital music, comprising:

a plurality of digital audio devices, each digital audio device able to store digital songs and to copy the digital songs stored therein to another digital audio device, wherein groups of the digital audio devices are registered with one another, the digital audio devices comprising acquisition devices and players, wherein each digital song stored in each digital audio device has a label that is an ownership label or a non-ownership label, and wherein a non-ownership label of a digital song comprises conditions under which playing of the digital song is not allowed, each player comprising a rights processor for receiving a request to play a designated song;

identifying the label of the designated song as being a non-ownership label; and denying the request to play the designated song in response to said identifying, in accordance with the conditions of the non-ownership label; and each digital audio device comprising a rights manager for labeling the digital songs stored within the digital audio devices, by (d.1) determining that a first designated digital song bearing an ownership label may be copied to a first target digital audio device that is registered with the digital audio device, when the digital audio device is an acquisition device, (d.2) determining that a second designated digital song bearing an ownership label may be copied to a second target digital audio device that is an acquisition device and that is registered with the digital audio device, when the digital audio device is a player, prescribing the label of the first and second designated digital song for the respective first and second target digital audio device to be an ownership label, in response to (d.1) and (d.2), respectively, (d.3) determining that a third designated digital song bearing an ownership label may be copied to a third target digital audio device that is a player and that is registered with the digital audio device, when the digital audio device is a player, (d.4) determining that a fourth designated digital song bearing a non-ownership label may be copied to a fourth target digital audio device that is registered with the digital audio device, (d.5) determining that a fifth designated digital song bearing an ownership label may be copied to a fifth target digital audio device that is not registered with the digital audio device, (d.6) determining that a sixth designated digital song bearing a non-ownership label may be copied to a sixth target digital audio device that is not registered with the digital audio device, and prescribing the label of the third, fourth, fifth and sixth designated digital song for the respective third, fourth, fifth and sixth target digital audio device to be a non-ownership label, in response to (d.3), (d.4), (d.5) and (d.6), respectively.

18. The system of claim 17 wherein at least one non-ownership label is a trial version label, and wherein said rights manager prescribes the labels of the third, fifth and sixth designated digital songs for the respective third, fifth and sixth target digital audio devices to be trial version labels.

19. The system of claim 17 wherein at least one ownership label is an owned-by-purchase label.

20. The system of claim 17 wherein at least one ownership label is an owned-by-recording label.

* * * * *